(12) United States Patent
Mahajan et al.

(10) Patent No.: US 11,042,467 B2
(45) Date of Patent: Jun. 22, 2021

(54) AUTOMATED SEARCHING AND IDENTIFICATION OF SOFTWARE PATCHES

(71) Applicant: FUJITSU LIMITED, Kawasaki (JP)

(72) Inventors: Sonal Mahajan, Fremont, CA (US); Mukul R. Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 23 days.

(21) Appl. No.: 16/550,069

(22) Filed: Aug. 23, 2019

(65) Prior Publication Data

US 2021/0056006 A1    Feb. 25, 2021

(51) Int. Cl.
*G06F 11/36* (2006.01)
*G06F 8/41* (2018.01)
*G06F 16/953* (2019.01)

(52) U.S. Cl.
CPC .......... *G06F 11/362* (2013.01); *G06F 8/427* (2013.01); *G06F 16/953* (2019.01)

(58) Field of Classification Search
CPC ............ G06F 11/3604; G06F 11/3608; G06F 11/362; G06F 8/42; G06F 8/427; G06F 8/43

See application file for complete search history.

(56) References Cited

U.S. PATENT DOCUMENTS

| | | | | |
|---|---|---|---|---|
| 9,965,633 | B2* | 5/2018 | Brucker | H04L 63/1433 |
| 2008/0282104 | A1* | 11/2008 | Khan | G06F 11/3608 |
| | | | | 714/2 |
| 2015/0363294 | A1* | 12/2015 | Carback, III | G06F 8/37 |
| | | | | 717/132 |
| 2019/0278572 | A1 | 9/2019 | Yoshida | |
| 2019/0391904 | A1* | 12/2019 | Sabharwal | G06F 8/65 |
| 2020/0210158 | A1* | 7/2020 | Bucuvalas | G06F 8/433 |

OTHER PUBLICATIONS

Thiselton, "Enhancing Python Compiler Error Messages via Stack Overflow",Jun. 2019,IEEE,pp. 1-12 (Year: 2019).*
Koschke, "Clone Detection Using Abstract Syntax Suffix Trees",Jan. 2006,IEEE,pp. 1-10 (Year: 2006).*

(Continued)

*Primary Examiner* — Duy Khuong T Nguyen
(74) *Attorney, Agent, or Firm* — Maschoff Brennan

(57) ABSTRACT

A method may include obtaining a first violation in a first software program and identifying one or more characteristics of the first violation. The method may include searching at least one website to identify a set of posts. The method may include obtaining, as a first context, a first portion of the first software program that includes the first violation. The method may include obtaining a set of second contexts, each second context corresponding to a different post of the set of posts. The method may also include determining a set of similarity scores by comparing a first abstract tree representation of the first context with each second abstract tree representation corresponding with the second contexts and selecting a particular post based on the similarity score between the first abstract tree representation and the particular second abstract tree representation associated with the particular post.

17 Claims, 14 Drawing Sheets

(56) References Cited

OTHER PUBLICATIONS

Prompter (Ponzanelli et al., MSR'14): Retrieves code context and recommends useful StackOverflow discussions ranked heuristically (2014).
Libra (Ponzanelli et al., ICSE'17): Provides guidance in selecting discussions by tracking developer's activity in the IDE and web browser (2017).
ExampleStack (Zhang et al., ICSE'19): Uses code clone detection to find adaptation examples from Big Code (GitHub) for discussions on StackOverflow (May 25, 2019).
GenProg (Weimer et al., ICSE'09, Le Goues et al., ICSE'12): Genetic programming based search with repair templates are identified from existing program structure (2012).
Kali (Long et al., ISSTA'15): GenProg successor; improves efficiency by limiting repair templates to only functional deletions (2015).
Prophet (Long et al., POPL'16): Learns a model from a set of successful human patches and uses the model to rank candidate patches in order of likely correctness (2016).
PAR (Kim et al., ICSE'13): Rule-based method where repair templates are manually predefined based on human patch analysis (2013).
NPEfix (Durieux et al., SANER'17): Fixes NullPointerExceptions by creating a metaprogram with mutations of the buggy lines and executing each mutation against a failing test case. (2017).
Elixir (Saha et al., ASE'17): Generate-and-validate technique that leverages program context to synthesize method invocations for repair (2017).
Genesis (Long et al., FSE'17): Repairs a small set of errors by defining search space based on inferred transformations from previous successful patches (2017).
Refazer (Rolim et al., ICSE'17): Learns program transformations from examples, and uses transformations to perform repetitive code edits to correct errors in student programs. (2017).

\* cited by examiner

```
@Override
public void dropColumn (String databaseName, String tableName, String columnName)
{
    verifyCanDropColumn (this, databaseName, tableName, columnName);
    org.apache.hadoop.hive.metastore.api.Table table =
        delegate.getTable (databaseName, tableName)
            .orElseThrow (() -> new TableNotFoundException (new
                SchemaTableName(databaseName, tableName)));
    for (FieldSchema fieldSchema : table.getSd().getCols()) {
        if (fieldSchema.getName().equals(columnName)) {
            table.getSd().getCols().remove(fieldSchema);
        }
    }
    alterTable(databaseName. tableName, table);
}
```

*FIG. 3A*

```
Collection<Integr> l = new Arraylist<>();
for (int i : l) {
    if (i == 5) {
        l.remove(i);
    }
}
```

*FIG. 3B*

```
Collection<T> myCollection;
for(Iterator<?> index = myCollection.iterator();
    index.hasNext();) {
    Object item = index.next();
    myCollection.remove(item);
}
```

*FIG. 3C*

AUTOMATED SEARCHING AND IDENTIFICATION OF SOFTWARE PATCHES

FIELD

The embodiments discussed in the present disclosure are related to automated searching and identification of software patches.

BACKGROUND

Software programs often have errors in them (commonly referred to as "bugs" or "violations") and the software programs thus may not operate as intended. Various methods and systems may be used in an attempt to identify patches to correct errors in software programs.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

A method may include obtaining a first violation in a first software program. The method may include identifying one or more characteristics of the first violation. The method may further include searching at least one website to identify a set of posts on the at least one website. Each post of the set of posts may be identified based on each post including content with respect to one or more other violations of other software programs that have at least one of the one or more characteristics of the first violation. The method may also include obtaining, as a first context, a first portion of the first software program that includes the first violation. The method may further include obtaining a set of second contexts, each second context of the set of second contexts corresponding to a different post of the set of posts. Each second context may include a respective portion of a corresponding one or the other software program that includes a corresponding other violation. The method may also include obtaining a first abstract syntax tree of the first context, the method may further include obtaining a set of second abstract syntax trees. Each second abstract syntax tree of the set of second abstract syntax trees may correspond to a different second context of the set of second contexts. The method may also include modifying the first abstract syntax tree to obtain a first abstract tree representation of the first context by simplifying and abstracting the first abstract syntax tree. The method may further include modifying each second abstract syntax tree of the set of second abstract syntax trees to obtain a set of second abstract tree representations by simplifying and abstracting each second abstract syntax tree. The method may also include determining a set of similarity scores. Each similarity score of the set of similarity scores may be determined by comparing the first abstract tree representation with a corresponding one of the second abstract tree representation of the set of second abstract tree representations. The method may also include selecting a particular post of the set of posts based on the similarity score between the first abstract tree representation and a particular second abstract tree representation of the set of second abstract tree representations associated with a particular second context, the particular second context associated with a particular portion of a particular software program and a particular violation of the particular post.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 3A-3F illustrate a comparison of the similarity of software programs;

DESCRIPTION OF EMBODIMENTS

Figure 1:
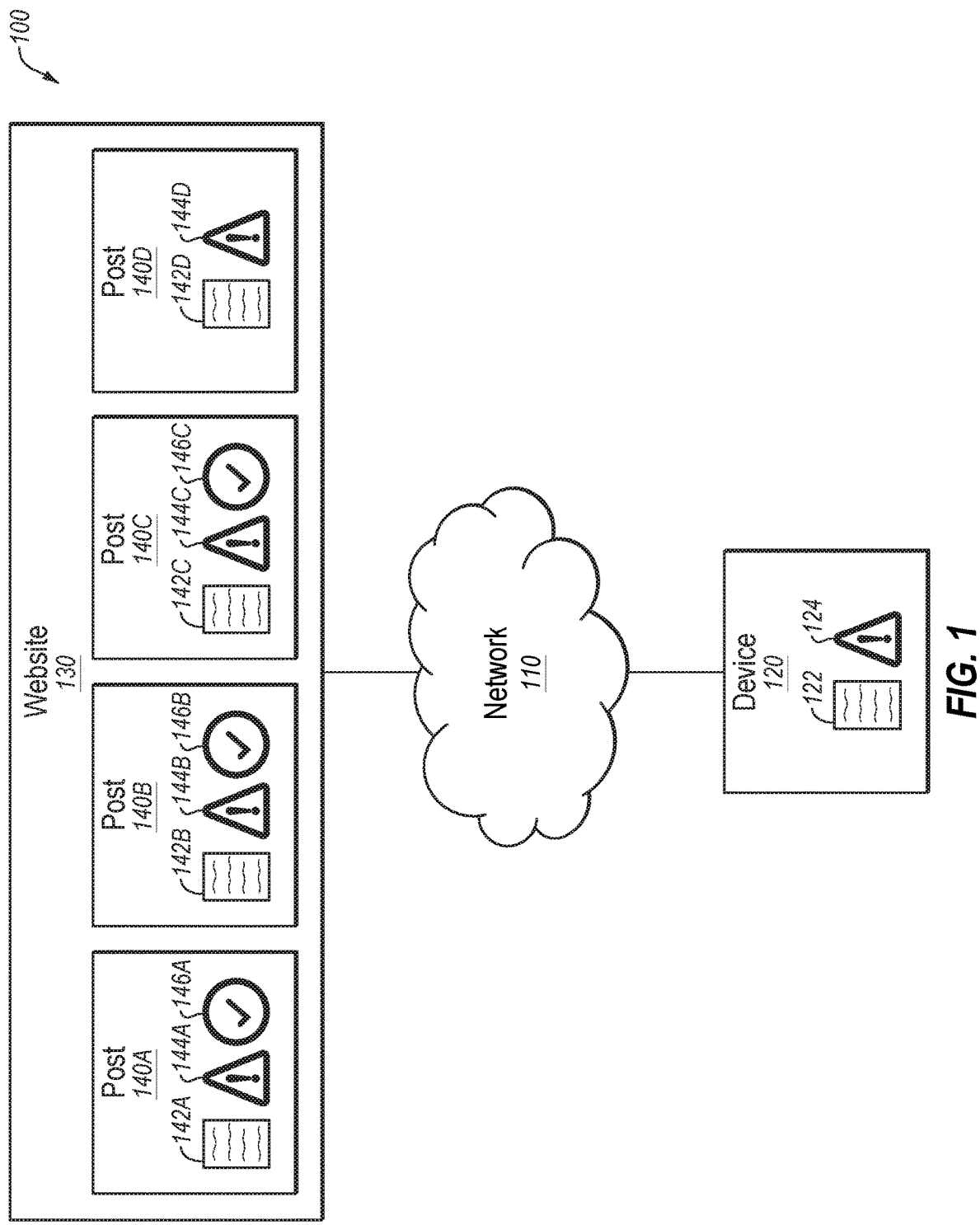
FIG. 1 is a diagram representing an example environment related to automated searching and identification of software patches.

Some embodiments described in the present disclosure relate to methods and systems of automatic searching and identification of software patches. Software programs often include errors (also commonly referred to as "bugs" or "violations") that may cause the software program to behave in an unintended manner. Additionally, various systems and techniques are often used to search and identify software patches to repair software programs.

During the development of a software program, a user may encounter one or more violations when writing the software program. In an attempt to remediate the violations, the user may consult programming books, may look at guides on the internet, and may search online discussion forums for related discussions or posts that might provide assistance in resolving the violation. But the user's attempt to rectify the violation may be inefficient. For example, the user may not entirely grasp what the violation is and/or why the violation is showing up in the user's code. So, the user may seek to find solutions to a different problem than what the user is actually facing. Additionally, the user may be unable to determine whether potential solutions to the violation that the user may find are relevant to the user's problem, i.e., the user may be unable to determine whether the potential patches the user finds are solutions to a violation that is similar to the violation the user has encountered. Thus, even if a user is able to find potential solutions that may be relevant, the user may then wade through these potential solutions without fully understanding which may be the most beneficial. This task may be made more difficult by the user's difficulty in particularly articulating the exact source of the violation and in identifying a suitable solution from the myriad possible solutions that result from the search.

According to one or more embodiments of the present disclosure, the technological field of software development may be improved by configuring a computer system in a manner in which the computing system is able to identify violations in a software program and identify other software programs as similar to the software program. In some embodiments, the computer system may automatically perform repair operations after identifying a patch for the violations. Alternatively or additionally, in some embodiments, the computer system may display an identified software program and a user may perform repair operations based on the identified software program and/or a patch associated with the identified software program. For example, the computing system may be configured to identify a violation in a software program. The computing system may then identify characteristics of the violation and perform a search of one or more websites to generate a set of posts on the websites that are related to the violation and its characteristics. The computing system may then determine the similarity between code snippets in each post of the set of posts and the software program that has the violation and may select the post that has the code snippet with the highest similarity to the software program. The computing system may then present the post that has the highest similarity on a display so that a user may perform repair operations on the software program based on the selected post.

In some embodiments, the system may facilitate the development of software programming by finding particular patches for violations in a software program in a particular manner. The system may find particular patches that may be more suitable for and more relevant to a user's code than a user could find on his or her own. Additionally, the system may find patches more quickly than a user. The improved relevancy of the patches may help remediate software violations. Speed of identification of potential patches to remediate a software violation may help facilitate the development and testing of source code. In these and other embodiments, a user may more efficiently develop code by focusing on writing the code instead of bug-fixing, which may often occupy a large fraction of a user's time.

Alternatively or additionally, the system may identify more accurate and/or more relevant patches for the software program than a user may identify. The identification of more accurate and/or more relevant patches may help a user write more efficient code or code that operates in a manner intended by a user. The improved identification of patches for a software program may thus facilitate the correction of the violation and consequently may help improve the particular source code.

Embodiments of the present disclosure are explained with reference to the accompanying drawings.

FIG. 1 is a diagram representing an example environment 100 related to automated searching and identification of software patches, arranged in accordance with at least one embodiment described in the present disclosure. The environment 100 may include a network 110, a device 120, and a website 130.

The network 110 may include any communication network configured for communication of signals between any of the components (e.g., the device 120 and the website 130) of the environment 100. The network 110 may be wired or wireless. The network 110 may have numerous configurations including a star configuration, a token ring configuration, or another suitable configuration. Furthermore, the network 110 may include a local area network (LAN), a wide area network (WAN) (e.g., the Internet), and/or other interconnected data paths across which multiple devices may communicate. In some embodiments, the network 110 may include a peer-to-peer network. The network 110 may also be coupled to or include portions of a telecommunications network that may enable communication of data in a variety of different communication protocols.

In some embodiments, the network 110 includes or is configured to include a BLUETOOTH® communication network, a Z-Wave® communication network, an Insteon® communication network, an EnOcean® communication network, a wireless fidelity (Wi-Fi) communication network, a ZigBee communication network, a HomePlug communication network, a Power-line Communication network, a message queue telemetry transport (MQTT) communication network, a MQTT-sensor (MQTT-S) communication network, a constrained application protocol (CoAP) communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 110 may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, or any other protocol that may be implemented with the device 120, the website 130, a cloud server communication, or a gateway.

The device 120 may include a computer-based hardware device that includes a processor, memory, and communication capabilities. The device 120 may be coupled to the network 110 to communicate data with any of the other components of the environment 100. Some examples of the device 120 may include a mobile phone, a smartphone, a tablet computer, a laptop computer, a desktop computer, a set-top box, a virtual-reality device, or a connected device, etc. The device 120 may include a processor-based computing device. For example, the device 120 may include a hardware server or another processor-based computing device configured to function as a server. The device 120 may include memory and network communication capabilities. In some embodiments, the device 120 may include a computing system such as described below with respect to FIG. 8.

In some embodiments, the device 120 may include a software program 122. In these and other embodiments, the software program 122 may include source code written in any programming language such as, for example, C++, C, assembly, C#, Java, BASIC, JavaScript, Python, and SQL, among others. In some embodiments, the software program 122 may include multiple methods. In these and other embodiments, a method may be a discrete sub-program inside the software program 122 which may be independently executable and/or distinct. For example, a method may be a sub-unit of the software program 122. In these and other embodiments, the software program 122 may be designed for a particular purpose and/or to achieve a particular goal.

In some embodiments, the software program 122 may include a violation 124. While a single violation 124 is depicted in FIG. 1, the software program 122 may include any number of violations 124. In some embodiments, the violations 124 may include compilation errors, run-time errors, logic errors, and/or other errors that may be identified by any suitable methodology. For example, in some embodiments, the violation 124 may include a syntax error that may be detected by a compiler prior to execution of a program based on the software program 122. For example, punctuation marks may be missing in the software program 122 and/or a variable may be used without being declared. Alternatively or additionally, in some embodiments, the violation 124 may include a run-time error. In these and other embodiments, the software program 122 may compile without any errors but errors may be encountered when attempting to execute the compiled software program 122. For example, the software program 122 may include division by zero or an attempt to access an element of an array that does not exist. Alternatively or additionally, in some embodiments, the violation 124 may include a logic errors. In these and other embodiments, the software program 122 may compile without any errors and no errors may be encountered when attempting to execute the compiled software program 122. However, the software program 122 may not function as anticipated by an author or designer of the software program 122.

In some embodiments, the violation 124 may include different characteristics. For example, the violation 124 may include a name of the violation 124. Alternatively or additionally, in some embodiments, the violation 124 may include a description of the violation 124. For example, the description of the violation 124 may include a type of the violation 124. Alternatively or additionally, the violation 124 may include a programming language. For example, the programming language may of the violation 124 may be the same as the programming language of the software program 122. As an example, the violation 124 may include a run-time exception. The name of the run-time exception may be "java.lang.ArraylndexOutOfBoundsException." The description of the exception may be "Index 10 out of bounds for length 10." The type for the exception may be an out-of-bounds exception. The programming language for the exception may be the Java programming language.

The website 130 may include any applicable website on the Internet. Alternatively or additionally, in some embodiments the website 130 may include an internal repository or resource, such as a collection of documents on an internal intranet site. For example, in some embodiments, the website 130 may include a discussion forum where users may post questions and other users may post answers. For example, one user may post a question in the form of a software program that includes a violation and another user may post an answer or patch to the question in the form of a corrected software program that no longer includes the violation. In these and other embodiments, multiple users may post answers to the question and/or one user may post multiple answers. In some embodiments, the user who posted the question may select one answer as resolving the violation the user experienced. In some embodiments, users of the website 130 may vote on different answers posted by users. While FIG. 1 depicts a single website 130, in some embodiments there may be multiple websites 130. In some embodiments, the website 130 may include multiple pages or multiple posts, such as the post 140A, the post 140B, the post 140C, and the post 140D (collectively the posts 140). While the website 130 is depicted with four posts 140, in some embodiments, the website 130 may include hundreds of posts 140, thousands of posts 140, hundreds of thousands of posts 140, or any number of posts 140. Furthermore, while the posts 140 are depicted as being associated with a single website 130, in some embodiments, some of the posts 140 may be associated with a first website and other posts 140 may be associated with a second website. For example, the post 140A and the post 140B may be associated with the website 130 while the post 140C and the post 140D may be associated with a different website.

In these and other embodiments, the posts 140 may each be associated with different software programs. For example, the post 140A may relate to a software program 142A, the post 140B may relate to a software program 142B, the post 140C may relate to a software program 142C, and the post 140D may relate to a software program 142D (collectively, the software programs 142). In some embodiments, reference to the software programs 142 may include references to lines of code of software programs. For example, the software program 142A may include multiple lines of a larger software program and may not include every line in the larger software program. In some embodiments, the software programs 142 may be the lines of code in larger software programs that include violations. Thus, references to the software programs 142 is not limited to entire programs. In these and other embodiments, the software programs 142 may each differ from each other and may differ from the software program 122. For example, the software programs 142 may each have a different purpose, have a different author, be written in a different programming language, or include different violations than the software program 122.

In some embodiments, the software programs 142 may be associated with different questions. For example, a user of the website 130 may create the post 140A on the website 130. As part of the post 140A, the user may add a software program 142A and may ask a question associated with the software program 142A. For example, the user may have experienced a violation while writing the software program 142A. To obtain assistance, the user may post the software program 142A to the website 130 as part of the post 140A. The user may write a question to ask other users of the website 130 how the user may remediate the violation and/or ask other users what is causing the violation in the software program 142A.

In some embodiments, the software program 142A may include a violation 144A, the software program 142B may include a violation 144B, the software program 142C may include a violation 144C, and the software program 142D may include a violation 144D (collectively the violations 144). In some embodiments, each of the violations 144 may be different violations from each other. For example, the violation 144A may be a run-time error, the violation 144B may be a logic error, the violation 144C may be a compilation error, and the violation 144D may be a run-time error distinct from the violation 144A. Alternatively or additionally, in some embodiments, one or more of the violations 144 may be the same violation, may be related violations, and/or may be similar violations. For example, in some embodiments, the violation 144A may be an index out of bounds violation in the C++ programming language while the violation 144C may be an index out of bounds violation in the Java programming language. In this example, the violation 144A and the violation 144C may be similar violations. In some embodiments, violations 144 may be determined to be similar violations even if the violations are manifested and/or handled differently in different environments. For example, an array index out of bounds access may be manifested and handled differently during runtime in a C++ environment verses a Java environment, even though the root cause of the behavior may be the same, i.e. attempting to access an array out of its prescribed bound of indices.

In some embodiments, one or more of the posts 140 may include a patch. For example, the post 140A may include a patch 146A, the post 140B may include a patch 146B, and the post 140C may include a patch 146C (collectively the patches 146). In some embodiments, one or more posts 140 may not include an associated patch 146. For example, the post 140D may not include a patch. In some embodiments, the patches 146 may represent a method to remediate the corresponding violations 144, i.e. the patch 146A may remediate the violation 144A such that, after applying the patch 146A to the software program 142A, the software program 142A no longer has the violation 144A. In some embodiments, the patches 146 may include source code that may be applied to a source of the violations 144 in the software programs 142. In some embodiments, one or more of the posts 140 may include multiple patches 146. For example, the post 140B may include multiple patches 146B. In these and other embodiments, different users of the website 130 may rank or vote for different patches 146B, such that one patch 146B may receive the most positive votes. In these and other embodiments, one of the patches 146B may be selected as the chosen patch 146B by the user who created the post 140B based on the chosen patch solving that user's problem.

In some embodiments, the posts 140 may include questions. For example, the software programs 142 may be integrated into a question posted by a user of the website 130. For example, a first user may have written the software program 142A and have encountered the violation 144A. The first user may then create a post 140A on the website 130 including the software program 142A, the violation 144A and details of the violation 144A, and a request for others to help resolve the violation 144A. In these and other embodiments, the patch 146A may represent an answer to the first user's question. For example, in these and other embodiments, a second user may add a patch 146A as an answer to the question in the post 140A.

A description of the operation of environment 100 follows. A user may write a software program 122 using the device 120. While writing the software program 122 or while testing the software program 122, the user may receive a notification of a violation 122. The device 120 may then perform a search of a website 130 using a search query based on characteristics of the violation 124 such as a name of the violation 124, a type of the violation 124, and/or a programming language associated with the software program 122 and/or the violation 124. In some embodiments, the search query may include tags to indicate whether the search should include unanswered posts 140, answered posts 140, or both unanswered and answered posts 140.

The search of the website 130 using the search query may return a set of posts 140. As described, the search of the website 130 may be based on characteristics of the violation 124 and may return posts 140 that include violations 144 that are similar to the violation 124. For example, the website 130 may include four posts 140. The search of the website 130 using the search query may return the post 140A and the post 140C because the violation 144A and the violation 144C are similar to the violation 124. The search of the website 130 may not return the post 140B because the violation 144B may not be similar to the violation 124. The search of the website 130 may not return the post 140D because the post 140D does not include a patch. In some embodiments, the device 120 may be configured to determine which violations are similar and which are not similar according to one or more operations described below with respect to FIGS. 2 and 5.

The device 120 may then determine a similarity between the software program 122 and the software program 142A and a similarity between the software program 122 and the software program 142C. In these and other embodiments, the device 120 may extract a method from the software program 122. In these and other embodiments, the method may include the source code that is associated with the violation 124. For example, the software program 122 may include hundreds of lines of code, thousands of lines of code, millions of lines of code, or any number of lines of code. The violation 124 may be associated with a method in the software program 122 and the method may include fewer lines of code than the entirety of the software program 122. The device may determine a similarity between the method of the software program 122 and the software program 142A and a similarity between the software program 122 and the software program 142C.

In some embodiments, the device 120 may determine the similarity between the software program 122 and one or more software programs 142 by comparing abstract tree representations of the software program 122 and/or a portion of the software program 122 with an abstract tree representation based on the software programs 142 and the patches 146. For example, as discussed below with reference to FIG. 7, a pattern may be extracted based on the software program 142A and one or more patches 146A. For example, the device 120 may select one or more nodes in an abstract tree representation of the software program 142A based on corresponding nodes in abstract tree representations in one or more patches 146A.

Alternatively or additionally, the device 120 may determine the similarity between the software program 122 and one or more software programs 142 using semantic and/or syntactic code clone detection. For example, the device 120 may compare the software program 122 with one or more of the software programs 142 using a different semantic code clone detection algorithm that that described above to determine the degree to which the software program 122 and one or more of the software programs 142 perform the same function or are doing the same or similar things. In this regard, the device 120 may compare the constructs and structure of the source code for the software program 122 and the one or more of the software programs 142.

Alternatively or additionally, in some embodiments, the device 120 may compare the software program 122 with one or more of the software programs 142 to determine a similarity using syntactic code clone detection. The device 120 may obtain a syntax tree for the software program 122 and may obtain syntax trees for the software programs 142 and may compare the syntax trees to determine a similarity.

The device 120 may then select the post 140 associated with the software program 142 with the highest similarity to the software program 122. For example, the software program 142C may be determined to be the most similar to the software program 122. In some embodiments, the device 120 may be configured to determine the similarity between the software programs 142 and the software program 122 according to one or more operations described below with respect to FIG. 7. The device 120 may select the post 140C. The device 120 may then display a patch based on the patch 146C to a user of the device 120 to allow the user of the device 120 to implement the patch 146C on the software program 122. Alternatively or additionally, in some embodiments, the device 120 and/or the user may perform repair operations on the software program 122 based on the post 140C, such as, for example, repair operations based on the patch 146C.

Modifications, additions, or omissions may be made to FIG. 1 without departing from the scope of the present disclosure. For example, the environment 100 may include more or fewer elements than those illustrated and described in the present disclosure. Moreover, in some embodiments, the software program 122 may be created and edited using a device different from the device 120. For example, in these and other embodiments, the user may use one device to create and/or edit the software program 122 and the device 120 may perform a search of the website 130 and identify posts 140 based on the violation 124.

Alternatively or additionally, in some embodiments, the device 120 and the operations discussed relative to the device 120 may be distributed across different systems. In these and other embodiments, the environment 100 may include the network 110 and one or more devices including the device 120 and the website 130, which may be communicatively coupled via the network 110.

Figure 2:
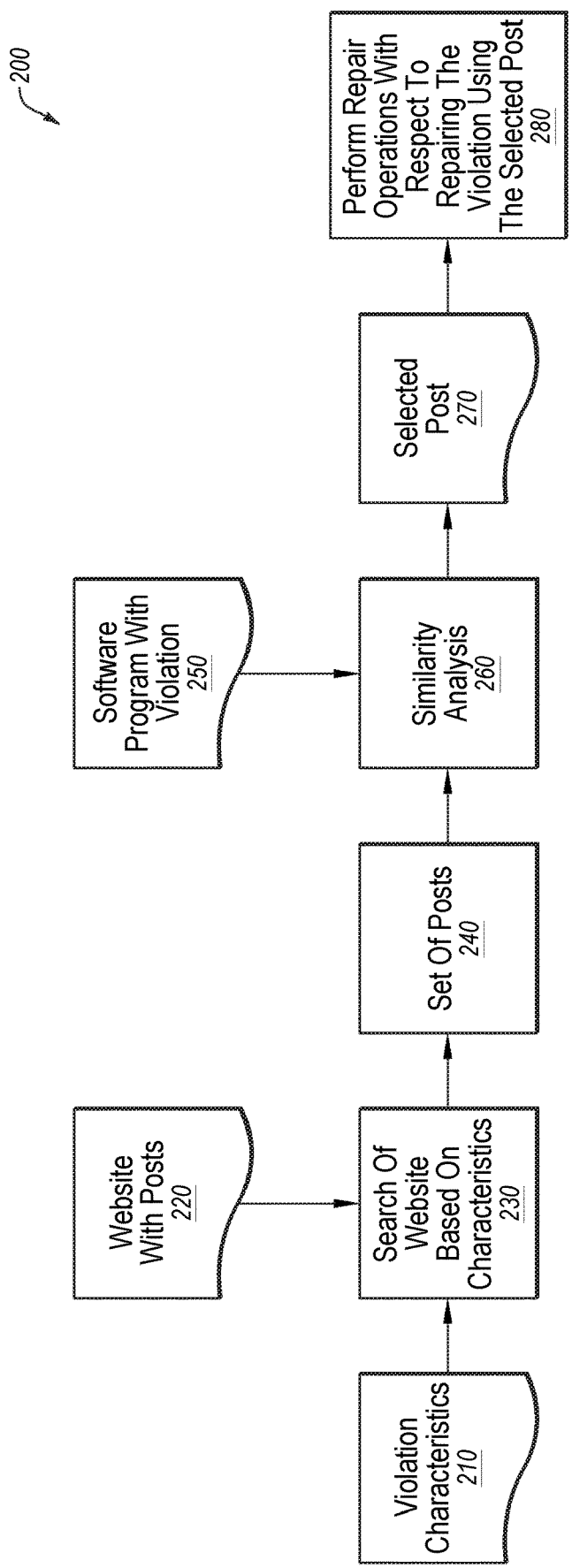
FIG. 2 is a flowchart of an example method of automated searching and identification of software patches.

FIG. 2 is a flowchart of an example method 200 of automated searching and identification of software patches. In some embodiments, one or more operations of the method 200 may be performed by a computing system or a device. As is illustrated in FIG. 2, a device, such as the device 120 of FIG. 1, may obtain violation characteristics 210. The violation characteristics 210 may include a name of a violation, a type of a violation, a programming language of a violation, a location in source code of a violation, among other characteristics. A website with posts 220 may include posts associated with programming, with source code, with identifying and resolving violations in source code, etc. Using the violation characteristics 210, a device may search the website based on the characteristics 230 to obtain a set of posts 240. In some embodiments, the website may be selected based on the website including a repository of software programs and/or software programs with violations and patches. For example, the website may include a variety of posts that include a software program with a violation. Some of the posts may also include patches which may be designed to remediate the violation in the software program. Alternatively or additionally, in some embodiments, the website may include an internal code repository, an internet site with questions and answers, a message board, etc. In some embodiments, there may be multiple websites with posts. For example, some posts may be associated with a first website and other posts may be associated with a second website.

In some embodiments, the device may perform the search 230 by forming a search query using one or more characteristics of the violation characteristics 210. For example, the search query may include the name of the violation and the type of the violation. In some embodiments, the search query may also include one or more tags such as a tag for answered questions and/or a tag for a programming language associated with the violation. Based on the search query, a set of posts 240 may be identified. For example, the set of posts may be identified based on each post in the set of posts including an answer to a question, the question in the posts including a code snippet with a violation with the same type and/or the same name as the violation characteristics 210, and the code snippet in the post being written in the same programming language as the violation. The search 230 may be considered a coarse search.

The device may then perform a similarity analysis 260 on the set of posts 240 and the software program with the violation 250. For example, the device may compare the software program with the violation 250 with code snippets from each post in the set of posts 240. In some embodiments, the similarity analysis may be performed by comparing abstract tree representations of the software program with the violation 250 with abstract tree representations based on each post of the set of posts as described below with respect to FIG. 7. In some embodiments, the similarity analysis may be performed using other forms of semantic and/or syntactic code clone detection. For example, the device may generate a similarity score for each post of the set of posts 240, the similarity score measuring a similarity between the code snippet of the post and the software program with the violation 250. In some embodiments, the device may generate a similarity score for a post of the set of posts 240 and a method in the software program, the method including the violation. In these and other embodiments, a greater similarity score may be associated with a greater similarity between the code snippet of a post and the software program with the violation 250. Alternatively or additionally, in some embodiments, a lesser similarity score may be associated with a greater similarity between the code snippet of a post and the software program with the violation 250.

In some embodiments, the device may select one post of the set of posts 240 based on the similarity score of the post. In some embodiments, each post may have a numerical similarity score. For example, a first post may have a similarity score of 5.4. A second post may have a similarity score of 7.6. The second post may be selected because it has a higher similarity score than the first post. The selected post 270 may then be used to perform repair operations 280 with respect to repairing the violation using the selected post 270. In some embodiments, the repair operations 280 may include presenting the selected post 270 on a display such as, for example, a computer screen connected to the device. A developer of the software program 250 may then repair the software program 250 based on the selected post 270. Alternatively or additionally, in some embodiments, the repair operations 280 may include the device repairing the software program 250 based on the selected post 270. For example, the selected post 270 may include a patch for the violation. For example, a user may have placed a question with the post on the website 220. Another user may have posted an answer to the question to the post. The device may perform repair operations including presenting the answer in the selected post 270 as a guide for creating a patch for the violation in the software program 250.

Figure 3D:
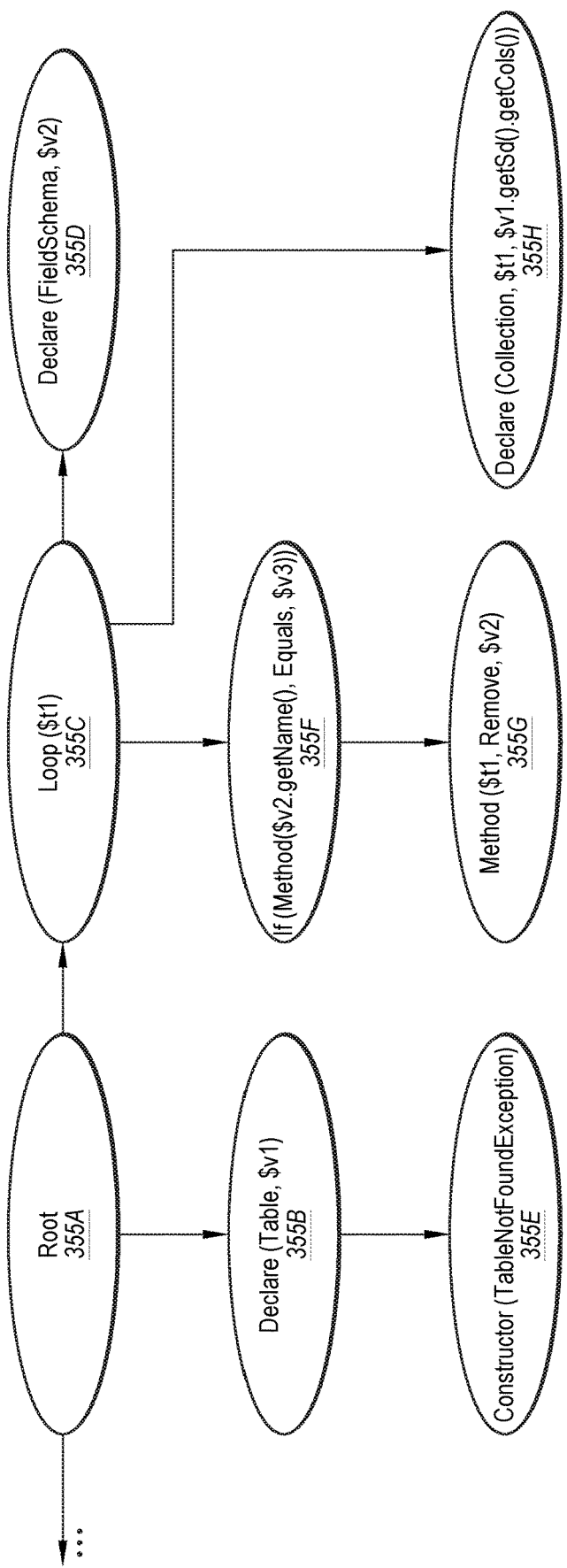

FIGS. 3A-3F illustrate a comparison of the similarity of software programs. FIG. 3A includes a software program 310. The software program 310 may represent the software program with a violation, such as the software program 122 of FIG. 1 and/or the software program with violation 250 of FIG. 2. A device, such as the device 120 of FIG. 1, may compare different code snippets with the software program 310. Each code snippet may be associated with a different post of a website, such as the website 130 of FIG. 1 and/or the website with posts 220 of FIG. 2. For example, the code snippet 320 of FIG. 3B may represent the software program 142A and the code snippet 330 of FIG. 3C may represent the software program 142B.

In some embodiments, the code snippet 320 of FIG. 3B and/or the code snippet 330 of FIG. 3C may include a portion of a software program 142A and/or 142B. In some embodiments, the code snippet 320 of FIG. 3B and/or the code snippet 330 of FIG. 3C may be a selection of a corresponding software program 142A and/or 142B that may be obtained using a method similar to that described below with reference to blocks 710 through 745 of FIG. 7. For example, as described below with reference to FIG. 7, an abstract tree representation of the software program 142A may be aligned with one or more abstract tree representations of patches 146A and relevancy scores at overlapping nodes may be summed. Nodes of the abstract tree representation of the software program 142A may be arranged in descending relevancy score order and a subset of the nodes may be extracted to generate the code snippet 320 of FIG. 3B.

In performing a similarity analysis between the software program 310 of FIG. 3A and the code snippet 320 of FIG. 3B and the code snippet 330 of FIG. 3C, the device may use semantic and/or syntactic code clone detection. For example, the device may compare the variable declarations, loop constructs, variable names, variable types, branch construction, conditional statements, input and output statements, programming language, and other factors to determine whether the software program 310 of FIG. 3A is similar to the code snippet 320 of FIG. 3B and the code snippet 330 of FIG. 3C. Alternatively or additionally, in some embodiments, the device may perform the comparison to generate a similarity score. In some embodiments, the similarity scores may be determined according to one or more operations described below with respect to FIG. 7.

In some embodiments, the device may determine a similarity score between the software program 310 of FIG. 3A and the code snippet 320 of FIG. 3B. In these and other embodiments, the device may also determine a similarity score between the software program 310 of FIG. 3A and the code snippet 330 of FIG. 3C. In some embodiments, the device may determine the similarity score between the software program 310 of FIG. 3A and the code snippet 320 of FIG. 3B and the similarity score between the software program 310 of FIG. 3A and the code snippet 330 of FIG. 3C by comparing abstract tree representations of the software program 310, the code snippet 320, and the code snippet 330.

FIG. 3D illustrates an abstract tree representation 350 of the software program 310 of FIG. 3A. In some embodiments, the abstract tree representation 350 may be obtained from the software program 310 as described below relative to block 710 of FIG. 7. The abstract tree representation 350 may include multiple nodes such as the node 355A, the node 355B, the node 355C, the node 355D, the node 355E, the node 355F, the node 355G, and the node 355H (collectively the nodes 355). Although the abstract tree representation of the software program 350 is depicted with eight nodes 355, it may include any number of nodes 355. In some embodiments, the nodes 355 may be associated with one or more lines of code in the corresponding software program 310. In some embodiments, multiple nodes 355 may be associated with a single line of code in the corresponding software program. Each of the nodes 355 in the abstract tree representation 350 may include a construct, a type, a variable, etc. For example, the node 355C may include the construct "loop" and may include the variable "$t1"). Similarly, the node 355B may include the construct "declare", may include the type "Table", and may include the variable "$v1".

Figure 3E:
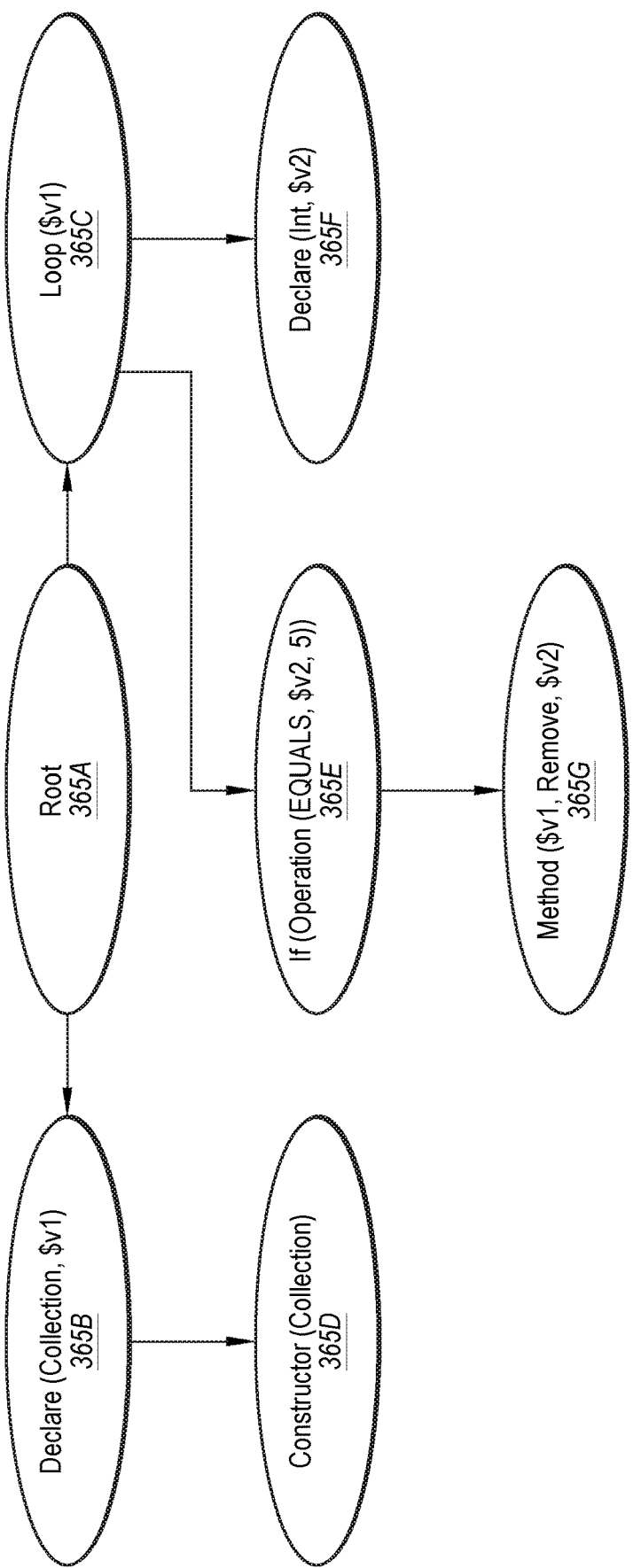

FIG. 3E illustrates an abstract tree representation 360 of the code snippet 320 of FIG. 3B. In some embodiments, the abstract tree representation 360 may be obtained as a pattern as described below relative to block 745 of FIG. 7. The abstract tree representation 360 may include multiple nodes such as the node 365A, the node 365B, the node 365C, the node 365D, the node 365E, the node 365F, and the node 365G (collectively the nodes 365). Although the abstract tree representation 360 is depicted with seven nodes 365, it may include any number of nodes 365. In some embodiments, the nodes 365 may be associated with one or more lines of code in a corresponding software program. In some embodiments, multiple nodes 365 may be associated with a single line of code in the corresponding software program. Similar to nodes 355 of the abstract tree representation 350 of FIG. 3D, each of the nodes 365 in the abstract tree representation 360 may include a construct, a type, a variable, etc.

To compare the software program 310 to the code snippet 320, the abstract tree representation 360 may be compared to the abstract tree representation 350 of FIG. 3D. To perform the comparison, the abstract tree representation 350 of FIG. 3D and the abstract tree representation 360 of FIG. 3E may be aligned to determine an overlap. In some embodiments, the alignment may be performed similar to that discussed below relative to block 725 of FIG. 7. For example, using tree edit distance, corresponding nodes of the two abstract tree representations may be determined. For example, node 355A of FIG. 3D may correspond with node 365A of FIG. 3E, node 355B of FIG. 3D may correspond with node 365B of FIG. 3E, node 355C of FIG. 3D may correspond with node 365C of FIG. 3E, node 355D of FIG. 3D may correspond with node 365F of FIG. 3E, node 355E of FIG. 3D may correspond with node 365D of FIG. 3E, node 355F of FIG. 3D may correspond with node 365E of FIG. 3E, and node 355G of FIG. 3D may correspond with node 365G of FIG. 3E. Node 355H of FIG. 3D may not have a corresponding node in FIG. 3E.

After aligning the abstract tree representation 350 of FIG. 3D and the abstract tree representation 360 of FIG. 3E, a similarity score may be computed based on multiple factors. For example, the similarity score may be based on construct similarity, type similarity, and variable-use relationship similarity. In some embodiments, the similarity score may be computed according to one or more operations described below with respect to FIG. 7. For example, the node 355B of FIG. 3D and the node 365B of FIG. 3E may exhibit construct similarity because both nodes include the construct "declare", the node 355C of FIG. 3D and the node 365C of FIG. 3E may exhibit type similarity because both nodes include the construct "loop" and further have a matching type, the node 355D of FIG. 3D and the node 365F of FIG. 3E may exhibit construct similarity because both nodes include the construct "declare", the node 355E of FIG. 3D and the node 365D of FIG. 3E may exhibit construct similarity because both nodes include the construct "constructor", the node 355F of FIG. 3D and the node 365E of FIG. 3E may exhibit construct similarity because both nodes include the construct "if", and the node 355G of FIG. 3D and the node 365G of FIG. 3E may exhibit type similarity because the nodes both include the construct "method" "remove" and have a matching type. Based on a weighting as discussed below relative to block 765 of FIG. 7, the abstract tree representation 350 of FIG. 3D and the abstract tree representation 360 of FIG. 3E may be determined to have a relatively high similarity or have a relatively high similarity score.

Figure 3F:
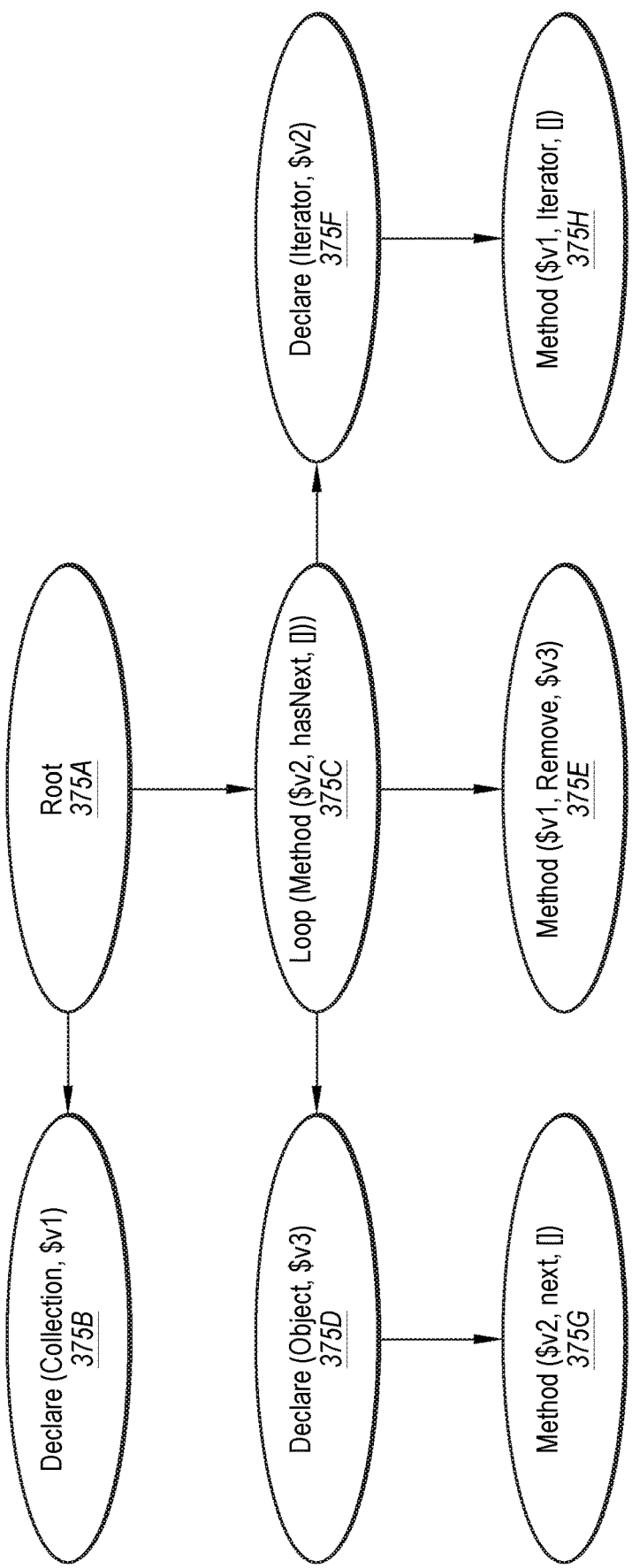

FIG. 3F illustrates an abstract tree representation 370 of the code snippet 330 of FIG. 3C. In some embodiments, the abstract tree representation 370 may be obtained as a pattern as described below relative to block 745 of FIG. 7. The abstract tree representation 370 may include multiple nodes such as the node 375A, the node 375B, the node 375C, the node 375D, the node 375E, the node 375F, the node 375G, and the node 375H (collectively the nodes 375). Although the abstract tree representation 370 is depicted with eight nodes 375, it may include any number of nodes 375. In some embodiments, the nodes 375 may be associated with one or more lines of code in a corresponding software program. In some embodiments, multiple nodes 375 may be associated with a single line of code in the corresponding software program. Similar to nodes 355 of the abstract tree representation 350 of FIG. 3D, each of the nodes 375 in the abstract tree representation 370 may include a construct, a type, a variable, etc.

To compare the software program 310 to the code snippet 330, the abstract tree representation 370 may be compared to the abstract tree representation 350 of FIG. 3D in a manner similar to that discussed above with reference to the abstract tree representation 360 of FIG. 3E. After aligning the abstract tree representation 350 of FIG. 3D and the abstract tree representation 370 of FIG. 3F, a similarity score may be computed based on similar factors as those discussed above with reference to the abstract tree representation 360 of FIG. 3E. For example, the node 355B of FIG. 3D and the node 375B of FIG. 3F may exhibit construct similarity because both nodes include the construct "declare", the node 355C of FIG. 3D and the node 375C of FIG. 3F may exhibit construct similarity because both nodes include the construct "loop", the node 355D of FIG. 3D and the node 375F of FIG. 3F may exhibit construct similarity because both nodes include the construct "declare", and the node 355G of FIG. 3D and the node 375E of FIG. 3F may exhibit construct similarity because the nodes both include the construct "method" "remove". Based on a weighting as discussed below relative to block 765 of FIG. 7, the abstract tree representation 350 of FIG. 3D and the abstract tree representation 370 of FIG. 3F may be determined to have a relatively low similarity and/or a relatively low similarity score compared to the abstract tree representation 350 of FIG. 3D and the abstract tree representation 360 of FIG. 3E. This may be evident by a reduced number of type similarities and/or construct similarities.

The software program 310 of FIG. 3A and the code snippets 320 and 330 of FIGS. 3B and 3C, respectively, are provided as examples. Similarly, the abstract tree representations 350, 360, and 370 of FIGS. 3D, 3E, and 3F, respectively are provided as examples.

Figure 4A:
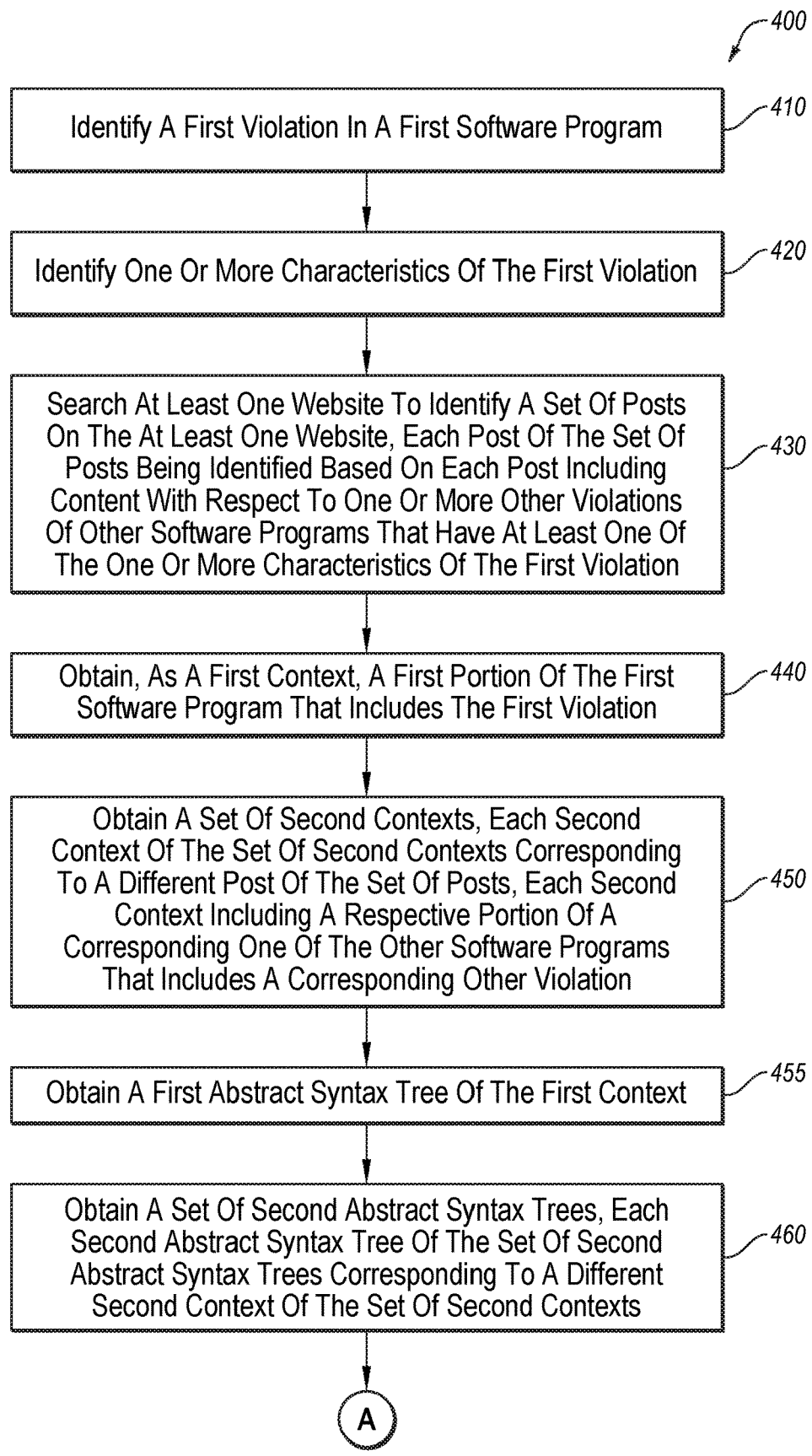
FIGS. 4A and 4B are a flowchart of an example method of automated searching and identification of software patches.
Figure 4B:
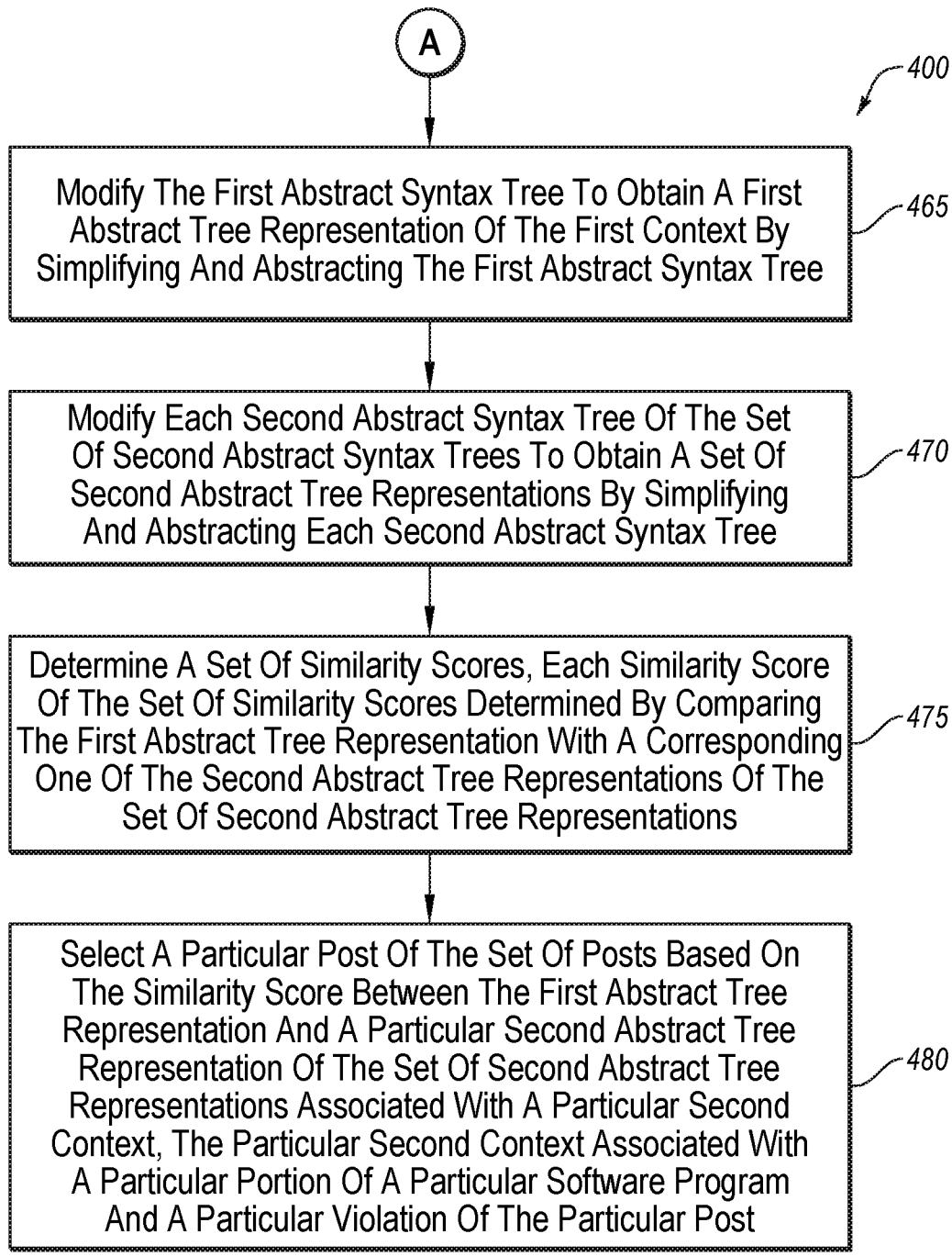

FIGS. 4A and 4B are a flowchart of an example method of automated searching and identification of software patches. The method 400 may be arranged in accordance with at least one embodiment described in the present disclosure. The method 400 may be performed, in whole or in part, in some embodiments, by a system and/or environment, such as the environment 100 and/or the computer system 802 of FIGS. 1 and 8, respectively. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 410, where a first violation in a first software program may be identified using any suitable methodology. In some embodiments, the first violation may include a run-time violation. In block 420, one or more characteristics of the first violation may be identified. In some embodiments, the one or more characteristics of the first violation may include an exception name, an exception type, or a source code language. In block 430, a website may be searched to identify a set of posts on the website. In some embodiments, the website may be searched based on the website including a repository of software programs, violations, and patches to remediate the violations in the software programs. Alternatively or additionally, in some embodiments, the website may be searched based on the website including questions and answers, including an internal repository of software violations and patches, and/or including multiple posts. In some embodiments, the set of posts may be a set of posts spread across different websites. For example, a first post of the set of posts may be from a first website, a second post and third post of the set of posts may be from a second website, and a fourth post of the set of posts may be from a third website. Each post of the set of posts may be identified based on each post including content with respect to one or more other violations of other software programs that have at least one of the one or more characteristics of the first violation. In some embodiments, searching the website to identify the set of posts may include generating a search query based on the one or more characteristics of the first violation and based on one or more tags. The one or more tags may indicate whether a post includes an answer or a source code language for the post. In some embodiments, searching the website may further include ranking multiple posts on the website based on the search query and identifying the highest ten ranked posts as the set of posts. Additional details regarding the search of the website are discussed below with reference to FIG. 5.

In block 440, a first portion of the first software program that includes the first violation may be obtained as a first context. In some embodiments, the first portion of the first software program that includes the first violation may include a method in the first software program that includes the first violation. In block 450, a set of second contexts may be obtained. Each second context of the set of second contexts may correspond to a different post of the set of posts. Each second context may include a respective portion of a corresponding other software program that includes a corresponding other violation.

In block 455 a first abstract syntax tree of the first context may be obtained. In block 460 a set of second abstract syntax trees may be obtained. Each second abstract syntax tree of the set of second abstract syntax trees may correspond to a different second context of the set of second contexts. In block 465, the first abstract syntax tree may be modified to obtain a first abstract tree representation of the first context. The first abstract syntax tree may be modified by simplifying and abstracting the first abstract syntax tree. In some embodiments, modifying the first abstract syntax tree may include combining a first node and a second node of the first abstract syntax tree to generate a third node of the first abstract tree representation. A data type of a variable of the third node of the abstract tree representation may be inferred to generate a fourth node of the first abstract tree representation. A construct of the third node of the first abstract tree representation may be generalized.

In block 470, each second abstract syntax tree of the set of second abstract syntax trees may be modified to obtain a set of second abstract tree representations by simplifying and abstracting each second abstract syntax tree. In some embodiments, modifying each second abstract syntax tree of the set of second abstract syntax trees to obtain the set of second abstract tree representations may include obtaining a third abstract syntax tree of a first patch associated with a particular post of the set of posts. The third abstract syntax tree may be modified to obtain a third abstract tree representation of the first patch by simplifying and abstracting the third abstract syntax tree. The second abstract tree representation associated with the particular post and the third abstract tree representation may be aligned to obtain a first plurality of overlap nodes. Each node of the first plurality of overlap nodes may correspond with a node in the second abstract tree representation. A first plurality of relevancy scores may be determined. Each relevancy score of the first plurality of relevancy scores may correspond with an overlap node of the first plurality of overlap nodes. A subset of the second abstract tree representation may be selected as the second abstract tree representation based on the first plurality of relevancy scores.

In some embodiments, block 470 may further include obtaining a fourth abstract syntax tree of a second patch associated with the particular post of the set of posts. The fourth abstract syntax tree may be modified to obtain a fourth abstract tree representation of the second patch by simplifying and abstracting the fourth abstract syntax tree. The second abstract tree representation associated with the particular post and the fourth abstract tree representation may be aligned to obtain a second plurality of overlap nodes. Each node of the second plurality of overlap nodes may correspond with a node in the second abstract tree representation. A second plurality of relevancy scores may be determined. Each relevancy score of the second plurality of relevancy scores may correspond with an overlap node of the second plurality of overlap nodes. The subset of the second abstract tree representation may be selected as the second abstract tree representation further based on the second plurality of relevancy scores.

In some embodiments, the first patch may be associated with a first number of answer votes and a first accepted answer flag and the second patch may be associated with a second number of answer votes and a second accepted answer flag. In these and other embodiments, the first plurality of relevancy scores may be determined based on the first number of answer votes and the first accepted answer flag and the second plurality of relevancy scores may be determined based on the second number of answer votes and the second accepted answer flag.

In block 475, a set of similarity scores may be determined. Each similarity score of the set of similarity scores may be determined by comparing the first abstract tree representation with a corresponding one of the second abstract tree representations of the set of second abstract tree representations.

In block 480, a particular post of the set of posts may be selected based on the similarity score between the first abstract tree representation and a particular second abstract tree representation of the set of second abstract tree representations associated with a particular second context, the particular second context associated with a particular portion of a particular software program and a particular violation of the particular post. Additional details related to selecting the particular post are discussed below relative to FIG. 6.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 400 may include additional blocks or fewer blocks.

Alternatively or additionally, in some embodiments, the method 400 may include performing repair operations with respect to repairing the violation using the particular post. For example, the repair operations may include presenting the particular post. For example, the particular post may be presented on a display such as a computer monitor, television, smartphone display, laptop screen, etc. A user may then perform repair operations on the software program based on the presentation of the particular post.

Figure 5:
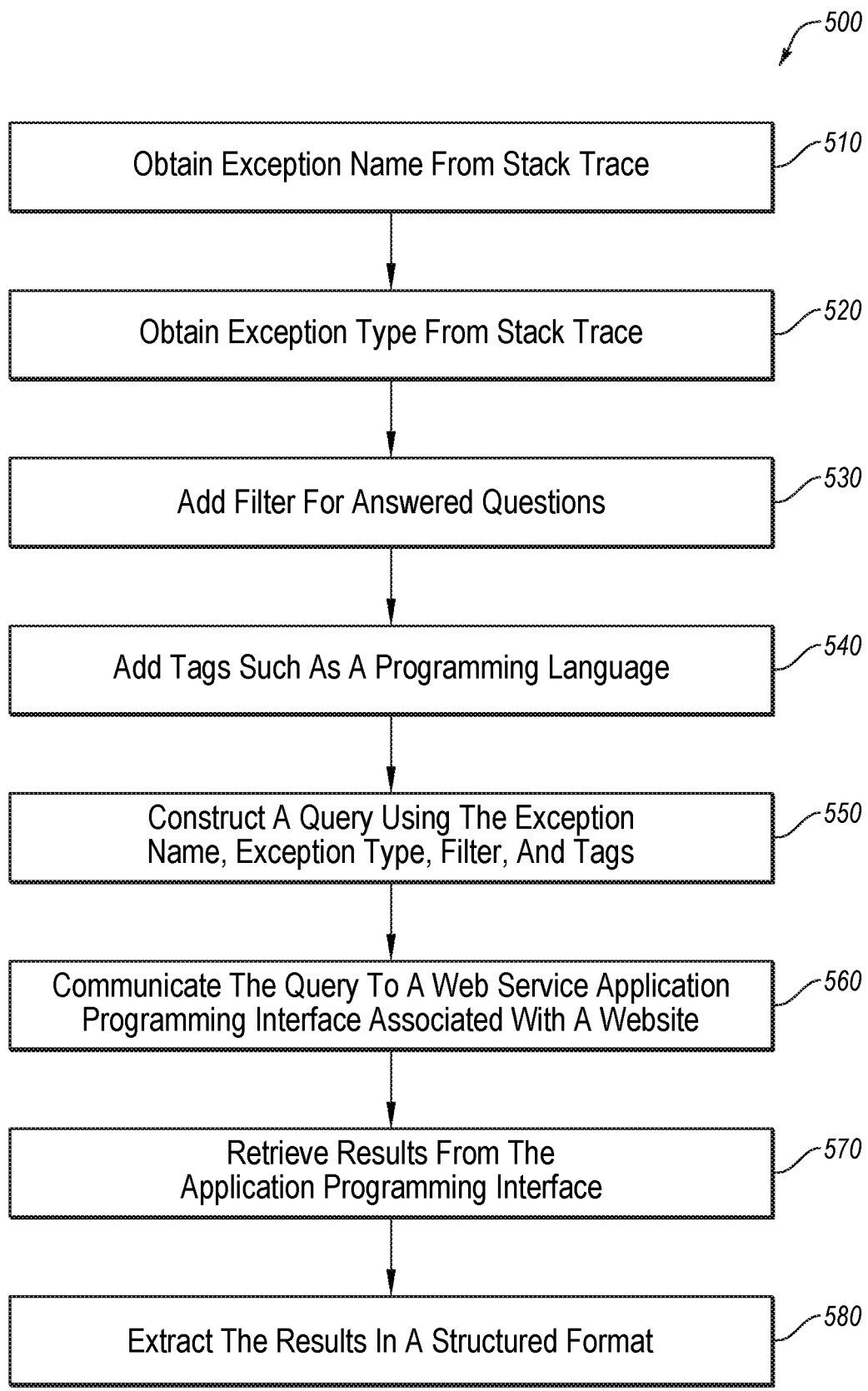
FIG. 5 is a flowchart of an example method of a coarse search.

FIG. 5 is a flowchart of an example method 500 of a coarse search. In some embodiments, the coarse search may include a search of a website as discussed above relative to block 430 of FIG. 4. At block 510, an exception name may be obtained from a stack trace. In some embodiments, run-time exceptions may be presented as a stack trace. For example, in response to the occurrence of a run-time exception, a device, such as the device 120 of FIG. 1, may examine the stack trace to obtain the exception name for the run-time exception. At block 520, an exception type may be obtained from the stack trace.

At block 530, a filter may be added for answered questions. In some embodiments, searches of particular websites may be associated with "question-answer" type posts, where each post may include a question. Some posts may also include an answer to the question. Alternatively or additionally, some posts may also include many different answers, potential answers, and/or suggested answers. In some embodiments, a search of a website may include an option to search only posts that include answers.

At block 540, tags such as a programming language tag may be added. In some embodiments, tags may include additional search criteria. For example, tags may include a recency option, such as requiring search results to have been posted, answered, updated, etc., within a recency period such as, for example, the most recent week, year, two years, etc. Alternatively or additionally, in some embodiments, tags may include an author tag, which may result in searches returning only posts where a particular author posted the question and/or posted the answer. Alternatively or additionally, in some embodiments, tags may include a programming language tag, which may result in searches returning only posts with code snippets written in a particular programming language. Alternatively or additionally, in some embodiments, tags may include a desired number of results from a search. For example, a tag may specify that ten search results be returned.

At block 550, a query may be constructed using the exception name, the exception type, the filter, and the tags. In some embodiments, the query may be order dependent. In these and other embodiments, the results from a search may be dependent on the order of the terms in the search query. For example, placing the exception name first in the search query may return different results upon performance of a search than placing the exception name last.

At block 560, the query may be communicated to a web service application programming interface (API) associated with a website. In some embodiments, the API may perform the search according to the search query and may return the results of the search. At block 570, the results may be retrieved from the application programming interface. In some embodiments, the results may be arranged in descending order of relevancy. For example, an algorithm used by the application programming interface may rank results of the search using the query. At block 580, the results may be extracted in a structured format. For example, in some embodiments, the posts on the website may include questions and answers. In these and other embodiments, the results of the search performed using the query may be structured to preserve the distinction between the question of the post and the answer to the question.

Modifications, additions, or omissions may be made to FIG. 5 without departing from the scope of the present disclosure. For example, the method 500 may include more or fewer elements than those illustrated and described in the present disclosure.

Figure 6:
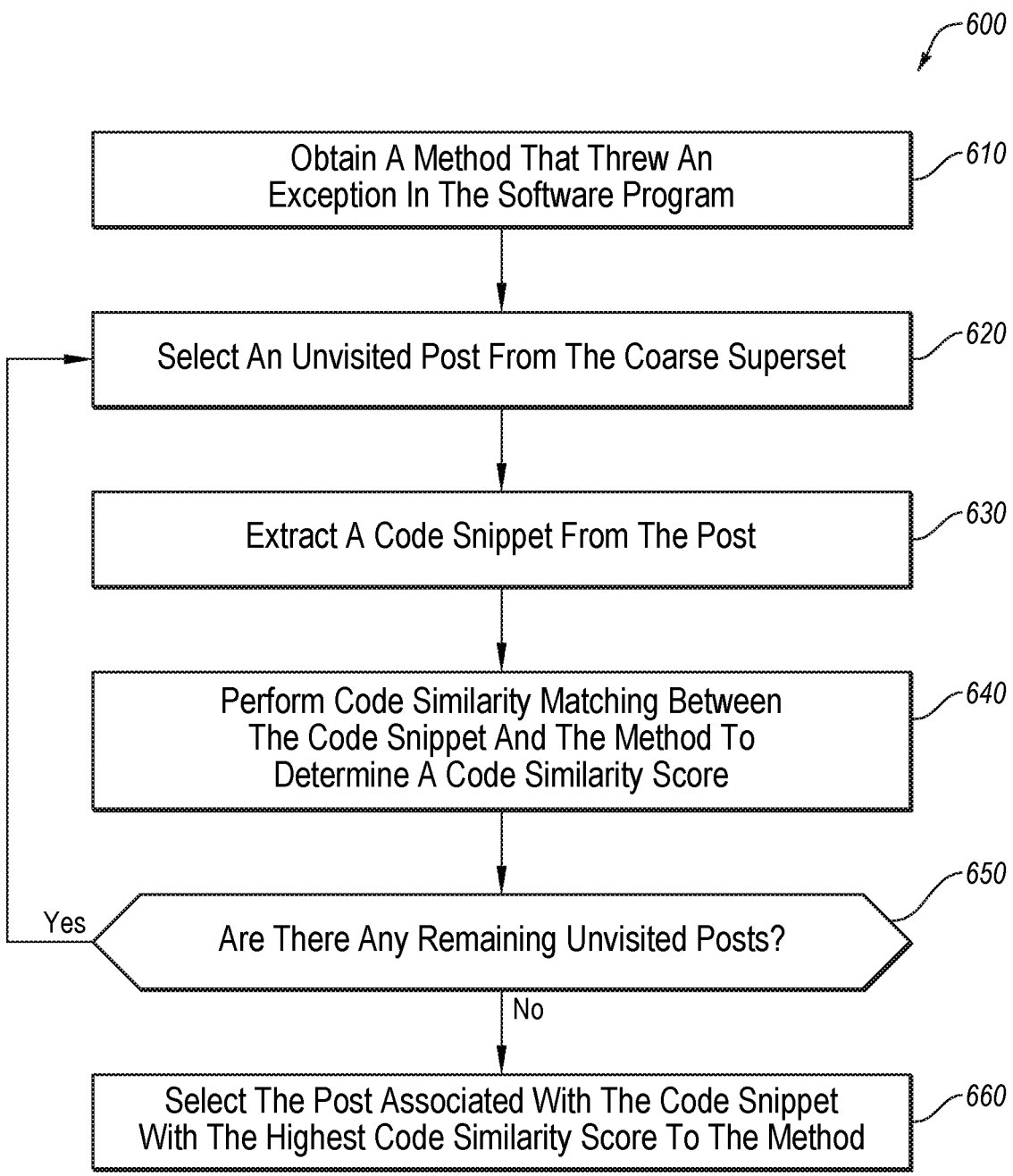
FIG. 6 is a flowchart of an example method of a fine search.

FIG. 6 is a flowchart of an example method 600 of a fine search. In some embodiments, the fine search may include selecting a particular post of a website as discussed above relative to block 460 of FIG. 4. At block 610, a method may be obtained from a software program. The method may have thrown an exception in the software program and may be obtained accordingly. For example, in some embodiments, a software program such as the software program 122 of FIG. 1 may include many methods. For example, the software program may include ten methods, one hundred methods, one thousand methods, or more methods. At block 620, an unvisited post may be selected from the coarse superset. The coarse superset may include the results retrieved at block 570 of FIG. 5, discussed above. For example, the coarse superset may include a set of posts obtained via a search performed using a query. When initially entering block 620, every post in the coarse superset may be flagged as unvisited. When a post is selected, the post may be flagged as visited.

At block 630, a code snippet may be extracted from the post. In some embodiments, a post may include a code snippet, which may represent a software program with a violation; a question associated with the code snippet; and one or more answers to the question. At block 640, code similarity matching may be performed between the code snippet and the method to determine a code similarity score. In some embodiments, the code similarity may be determined using a method such as the method 700 of FIG. 7 discussed below. Alternatively or additionally, in some embodiments, the code similarity may be determined using other methods for semantic and/or syntactic code clone detection. For example, the degree of similarity between functions, variables, constructs, values, and/or classes may be determined between the code snippet and the method. In some embodiments, a higher degree of similarity between the method and the code snippet may correspond with a higher code similarity score.

At decision block 650, it may be determined whether there are any remaining unvisited posts in the coarse superset. In response to there being remaining unvisited posts ("Yes" at decision block 650), the method may return to block 620 and may select another unvisited post from the coarse superset. In response to there not being remaining unvisited posts ("No" at decision block 650), the method may proceed to block 660. At block 660, the post associated with the code snippet with the highest code similarity score to the method may be selected. This post may be determined to be the most similar to the method.

Modifications, additions, or omissions may be made to FIG. 6 without departing from the scope of the present disclosure. For example, the method 600 may include more or fewer elements than those illustrated and described in the present disclosure.

Figure 7:
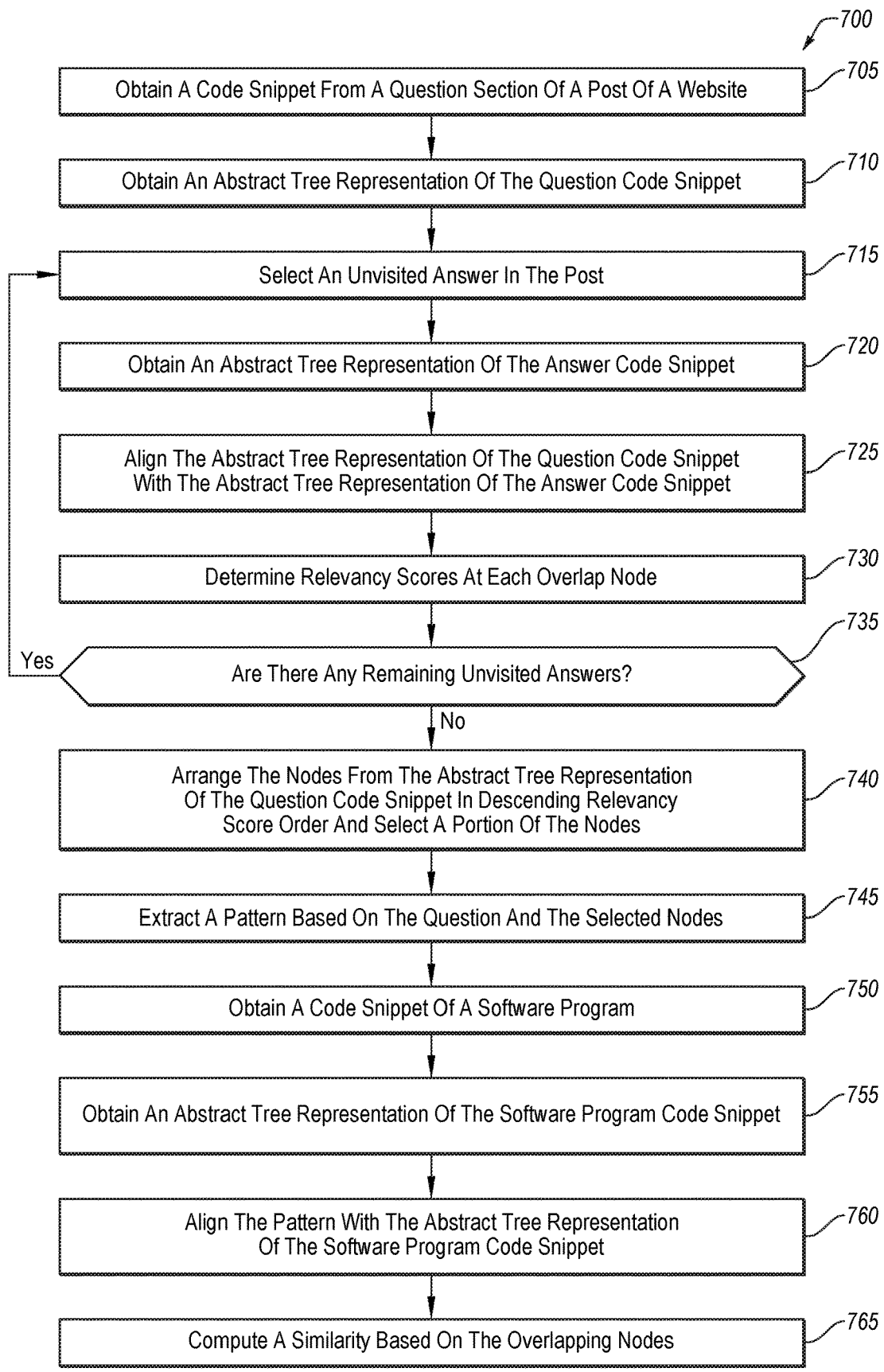
FIG. 7 is a flowchart of an example method of determining a similarity score.

FIG. 7 is a flowchart of an example method 700 of determining a similarity score. At block 705, a code snippet may be obtained from a question section of a post of a website (a "question code snippet"). At block 710, an abstract tree representation of the question code snippet may be obtained. The abstract tree representation of the question code snippet may be referred to as QT. In some embodiments, the abstract tree representation may be obtained by a process of simplification, type inference, and abstraction of an abstract syntax tree.

During simplification, an abstract syntax tree of the question code snippet may be obtained. As part of simplification, the abstract syntax tree may be parsed and compressed to make the tree compact and readable. In some embodiments, parsing and compressing the abstract syntax tree may include combining multiple nodes of the abstract syntax tree into a single node in a resulting abstract tree representation. For example, an abstract syntax tree may include a node for every token in a software program. For example, the statement in the source "int a;" may be represented in an abstract syntax tree as a series of nodes including statement nodes, expression nodes, variable nodes, etc. As part of simplification, the nodes in the abstract syntax tree associated with the statement in source code "int a;" may be parsed and compressed into a single node in the abstract tree representation, a "declare (int, a)" node. Parsing the source code may include dividing a statement in a source code into a construct, a type (i.e., a variable type), and a variable name. For example, constructs may include functions of statements in source code. For the "declare (int, a)" node above, the construct may be "declare", the type may be "int", and the variable name may be "a". Constructs may include loops such as "for", "for-each", "while", conditions such as "if", declarations and constructors, methods such as "delete" and "insert", etc. Types may include "integers" ("int"), floating point numbers ("float"), strings, Booleans, collections, etc.

During type inference, data types of variables may be inferred. Type inference may include determining an inferred type of a variable based on the usage of the variable in the source code. For example, variables used in loops such as "for" loops may be inferred to be integers even if the variable is not explicitly defined as such in the software program, abstract syntax tree, and/or compressed abstract syntax tree. As an additional example, a statement in the source code may include "if (flag)". The data type of the variable "flag" may not be identified in the source code; however, based on the usage of the variable "flag" in the "if" statement, it may be inferred that "flag" is a variable of the "Boolean" type. Thus, the statement "if (flag)" may be converted in the tree representation to a "root" node, an additional "declare (Boolean, flag)" node, and an "if (flag)" node. Similarly, type inference may involve inferring a method scope or caller and inferring variable values. During type inference, nodes may be added to the abstract tree representation that may not be present in the abstract syntax tree.

During abstraction, differing data types and/or constructs may be generalized to a single data type and/or construct. In these and other embodiments, data types of variables may be abstracted. For example, data types may be modified to a super-type of the variable. During abstraction, primitive data types, such as integers, floating point numbers, characters, strings, and Booleans, may remain without abstraction. Other data types may be a part of a super-type. For example, a "Collection" data type may include as a sub-type an "Array" data type. As part of abstraction, nodes that include variables that are of the "Array" data type may be abstracted to include variables that are of the "Collection" data type. Some data types may include application specific and/or user defined types. These data types may be converted into generic type variables. Additionally or alternatively, in some embodiments, a variable type may be abstracted into a supertype of the variable type. For example, in some programming languages, "Collection" may be a supertype for a "List." Thus, a "List" variable may be abstracted to be a "Collection" variable. Alternatively or additionally, during abstraction, identifier names may be abstracted. For example, a first variable name "list" may be abstracted to a name "$v1" and a second variable name "s" may be abstracted to "$v2." Alternatively or additionally, during abstraction, constructs may be generalized. For example, "for", "for-each", and "while" may each be abstracted to a "loop" construct. Additionally or alternatively, during abstraction, duplicate subtrees may be abstracted and refactored.

As an example, the software program may include two lines of source code:

List<String> list=new ArrayList< >( );
for (String s: list) { . . . } where the ellipsis represents any potential code.

During the process of simplification, type inference, and abstraction, an abstract syntax tree of the source code may be modified to generate an abstract tree representation. For example, the "List" variable type may be abstracted to a "Collection" variable type. The "list" variable name may be abstracted to a "$v1" variable name. The "for" loop construct may be abstracted to a "loop" construct. The variable name "s" may be abstracted to the variable name "$v2". The resulting abstract tree representation of the code may include a root node, a "declare (Collection, $v1)" node under the root node, a "constructor (Collection)" node under the "declare (Collection, $v1)" node, a "loop ($v1)" node under the root node, and a "declare (String, $v2)" node under the "loop ($v1)" node.

At block 715, an unvisited answer in the post may be selected. In some embodiments, the answer may include a code snippet (the "answer code snippet"). For example, the answer code snippet may be a patch or corrected version of a portion of the code snippet of the question. In these and other embodiments, the answer code snippet may not include each line of code included in the question code snippet. For example, a user may only include lines of code that are related to the violation in the answer. At block 720, an abstract tree representation of the answer code snippet may be obtained. The abstract tree representation of the answer code snippet may be referred to as $A_T$. In some embodiments, the abstract tree representation of the answer code snippet may be obtained in an analogous manner as the abstract tree representation of the question code snippet. At block 725, the abstract tree representation of the question code snippet and the abstract tree representation of the answer code snippet may be aligned to determine an overlap. In some embodiments, the alignment of the abstract tree representation of the question code snippet and the abstract tree representation of the answer code snippet may be determined using tree edit distance. In these and other embodiments, tree edit distance may be a representation of the degree of similarity and/or dissimilarity of different trees. For example, the tree edit distance may be computed. Based on the tree edit distance, the alignment between the abstract tree representation of the question code snippet and the abstract tree representation of the answer code snippet may be determined, i.e., it may be determined which nodes of the abstract tree representation of the question code snippet correspond with which nodes of the abstract tree representation of the answer code snippet. The tree edit distance may be determined based on the minimum number of operations needed to convert one of the two trees into the other tree. In these and other embodiments, the operations may include deletion operation (e.g., where a first tree includes a node the second tree lacks), an addition operation (e.g., where the first tree lacks a node the second tree includes), and a match operation (where a node on the first tree matches a node on the second tree in terms of content but the contexts of the two nodes may not necessarily match completely), among other operations.

At block 730, relevancy scores at each overlap node may be determined. In some embodiments, the relevance scores may be weighted. For example, in some embodiments, each answer may be associated with an answer vote. Users of the website may vote for a particular answer as being a solution to the question. A total number of votes associated with an answer may be associated with a relevance of the answer. In some embodiments, a user who asked the question in the post on the website may also select an answer as a best answer. In some embodiments, an answer selected as a best answer may be more relevant than other answers associated with the best. For example, in some embodiments, the relevancy score for a node associated with a particular answer may be determined as Relevancy Score$_{P,A}$=1+ (weight$_1$×answervotes)+(weight$_2$×if-accepted-answer). In these and other embodiments, answer votes may be a total number of votes on the website in favor of the answer and if-accepted-answer may be 1 if the answer has been marked as the best answer by an author of the question in the post and 0 otherwise. In these and other embodiments, weight$_1$ and weight$_2$ may be any number. For example, weight$_1$ may be 0.001 and weight$_2$ may be 2. For example, if the answer has zero votes and is not marked as the best answer, the relevancy score may be 1=1+(0.001×0)+(2×0). Alternatively, if the answer has one thousand votes and is marked as the best answer, the relevancy score may be 4=1+(0.001× 1,000)+(2×1).

At decision block 735, it may be determined whether there are any remaining unvisited answers associated with the question. In response to there being remaining unvisited answers ("Yes" at decision block 735), the method 700 may return to the block 715. In response to there being no remaining unvisited answers ("No" at decision block 735), the method 700 may proceed to block 740.

At block 740, the nodes from the abstract tree representation of the question code snippet may be arranged in descending relevancy score order and a portion of the nodes may be selected. In some embodiments, the weighted relevancy score at each overlap node may be summed across all answers associated with the post, Relevancy Score$_P$=ΣRevelancy Score$_{P,A}$. In some embodiments, a particular number of nodes may be selected, the selected nodes being the nodes with the highest relevancy scores. In these and other embodiments, the particular number may be five, ten, twenty, one hundred, or any number. For example, the particular number may be ten and the nodes with the top ten highest relevancy scores may be selected. Alternatively or additionally, in some embodiments, every node with a relevancy score above a threshold relevancy score may be selected. In these and other embodiments, the threshold relevancy may be two, ten, fifteen, or any number. For example, the threshold relevancy may be ten. Each node in the abstract tree representation of the question code snippet with a weighted relevancy score greater than or equal to ten may be selected. In some embodiments, the threshold relevancy may be determined based on a number of answers associated with the question.

At block 745, a pattern may be extracted based on the question and the selected nodes. In some embodiments, the pattern may be an abstract tree representation, similar to the abstract tree representations associated with the question code snippet and the answer code snippets. For example, the pattern may be a sub-tree of the abstract tree representation of the question code snippet obtained by only including the selected nodes.

At block 750, a code snippet of a software program (the "software program code snippet") may be obtained. In some embodiments, the software program code snippet may be a method of the software program. At block 755, an abstract tree representation of the software program code snippet may be obtained. In some embodiments, the abstract tree representation of the software program code snippet may be obtained in an analogous manner as the abstract tree representation of the question code snippet and the abstract tree representation of the answer code snippets.

At block 760, the pattern and the abstract tree representation of the software program code snippet may be aligned to find overlapping nodes. In some embodiments, the alignment may be analogous to the alignment of the abstract tree representation of the question code snippet and the abstract tree representations of the answer code snippets.

At block 765, a similarity score may be computed based on the overlapping nodes. In some embodiments, the similarity score may be weighted. In some embodiments, the similarity score may be computed based on multiple factors. For example, the similarity score may be based on construct similarity, type similarity, and variable-use relationship similarity, among other factors. In some embodiments, construct similarity may be present when overlapping nodes in abstract tree representation include the same construct. For example, when both overlapping nodes are "declare" constructs, there may be construct similarity. As discussed above, constructs may include "declare", "constructor", "loop", "method", "if", among others. In some embodiments, type similarity may be determined in response to determining there is construct similarity. In these and other embodiments, type similarity may be present when overlapping nodes in abstract tree representation include the same construct and the same type. For example, when both overlapping nodes are "declare" constructs and include "integer" types, there may be type similarity. As discussed above, types may include "Boolean", "collection", "string", "integer", "float", among others. In some embodiments, variable-use similarity may be determined in response to determining there is construct similarity and type similarity. In these and other embodiments, variable-use similarity may be present when a variable is used in similar manners in both overlapping nodes. For example, when a variable is used in a loop and a remove method in both the abstract tree representation of the software program code snippet and the pattern, there may be variable-use similarity. In some embodiments, variable-use similarity may be determined using the Jaccard index.

The similarity score may be calculated as Similarity Score=(weight$_A$×construct similarity)+(weight$_B$×type similarity)+(weight$_C$×variable-use relationship similarity). In these and other embodiments, the construct similarity may be a number of overlapping nodes with matching constructs. In these and other embodiments, the type similarity may be a number of overlapping nodes with both matching constructs and matching types. In these and other embodiments, the variable-use relationship similarity may be a number of instances in which variables are used in the same or similar situations. Alternatively or additionally, in some embodiments, the variable-use relationship similarity may be measured as the Jaccard index, J, which, as discussed above, may be determined as the size of the intersection of the number of places a variable is used in the code snippet of the software program, V$_{SP}$ and number of places the corresponding variable appearing in a matching node in the pattern is used in the pattern, V$_P$, divided by the size of the union.

$$J(V_{SP}, V_P) = \frac{|V_{SP} \cap V_P|}{|V_{SP} \cup V_P|} = \frac{|V_{SP} \cap V_P|}{|V_{SP}| + |V_P| - |V_{SP} \cap V_P|}.$$

In some embodiments, different factors may have different weights. For example, weight$_A$ associated with construct similarity may be 0.5, weight$_B$ associated with type similarity may be 2.0, and weight$_C$ associated with variable-relationship use similarity may be 1.0.

Modifications, additions, or omissions may be made to FIG. 7 without departing from the scope of the present disclosure. For example, the method 700 may include more or fewer elements than those illustrated and described in the present disclosure. Alternatively or additionally, in some embodiments, the elements may be placed in a differing order. For example, block 750 may be placed before block 705.

Figure 8:
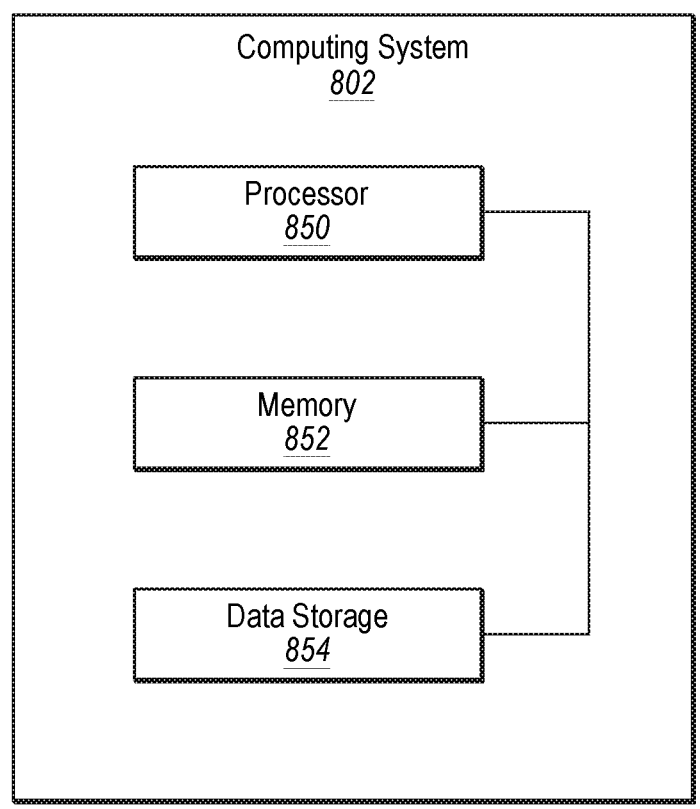
FIG. 8 illustrates an example computing system that may be configured to automatically search and identify software patches.

FIG. 8 illustrates a block diagram of an example computing system 802, according to at least one embodiment of the present disclosure. The computing system 802 may be configured to implement or direct one or more operations associated with automated searching and identification of software patches. The computing system 802 may include a processor 850, a memory 852, and a data storage 854. The processor 850, the memory 852, and the data storage 854 may be communicatively coupled.

In general, the processor 850 may include any suitable special-purpose or general-purpose computer, computing entity, or processing device including various computer hardware or software modules and may be configured to execute instructions stored on any applicable computer-readable storage media. For example, the processor 850 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 8, the processor 850 may include any number of processors configured to, individually or collectively, perform or direct performance of any number of operations described in the present disclosure. Additionally, one or more of the processors may be present on one or more different electronic devices, such as different servers.

In some embodiments, the processor 850 may be configured to interpret and/or execute program instructions and/or process data stored in the memory 852, the data storage 854, or the memory 852 and the data storage 854. In some embodiments, the processor 850 may fetch program instructions from the data storage 854 and load the program instructions in the memory 852. After the program instructions are loaded into memory 852, the processor 850 may execute the program instructions.

For example, in some embodiments, the methods 400 of FIG. 4, 500 of FIG. 5, and/or 600 of FIG. 6 may be included in the data storage 854 as program instructions. The processor 850 may fetch the program instructions of the methods from the data storage 854 and may load the program instructions of the methods in the memory 852. After the program instructions of the methods are loaded into memory 852, the processor 850 may execute the program instructions such that the computing system may implement the operations associated with the methods as directed by the instructions.

The memory 852 and the data storage 854 may include computer-readable storage media for carrying or having computer-executable instructions or data structures stored thereon. Such computer-readable storage media may include any available media that may be accessed by a general-purpose or special-purpose computer, such as the processor 850. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 850 to perform a certain operation or group of operations.

Modifications, additions, or omissions may be made to the computing system 802 without departing from the scope of the present disclosure. For example, in some embodiments, the computing system 802 may include any number of other components that may not be explicitly illustrated or described.

As may be understood, automated searching and identification of software patches through a two-step search process as discussed above may be used as a means for improving software programming and/or reducing the time to develop software programs. Hence, the systems and methods described herein provide the ability to correct violations in software programs and, in some instances, reduce the development time for developing software programs.

As indicated above, the embodiments described in the present disclosure may include the use of a special-purpose or general-purpose computer (e.g., the processor 850 of FIG. 8) including various computer hardware or software modules, as discussed in greater detail below. Further, as indicated above, embodiments described in the present disclosure may be implemented using computer-readable media (e.g., the memory 852 or data storage 854 of FIG. 8) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
 identifying a first violation in a first software program;
 identifying one or more characteristics of the first violation;
 searching at least one website to identify a set of posts on the at least one website, each post of the set of posts being identified based on each post including content with respect to one or more other violations of other software programs that have at least one of the one or more characteristics of the first violation;

obtaining, as a first context, a first portion of the first software program that includes the first violation;

obtaining a set of second contexts, each second context of the set of second contexts corresponding to a different post of the set of posts, each second context including a respective portion of a corresponding one of the other software programs that includes a corresponding other violation;

obtaining a first abstract syntax tree of the first context;

obtaining a set of second abstract syntax trees, each second abstract syntax tree of the set of second abstract syntax trees corresponding to a different second context of the set of second contexts;

modifying the first abstract syntax tree to obtain a first abstract tree representation of the first context by simplifying and abstracting the first abstract syntax tree;

modifying each second abstract syntax tree of the set of second abstract syntax trees to obtain a set of second abstract tree representations by simplifying and abstracting each second abstract syntax tree, wherein modifying each second abstract syntax tree of the set of second abstract syntax trees to obtain the set of second abstract tree representations by simplifying and abstracting each second abstract syntax tree comprises:

obtaining a third abstract syntax tree of a first patch associated with a particular post of the set of posts;

modifying the third abstract syntax tree to obtain a third abstract tree representation of the first patch by simplifying and abstracting the third abstract syntax tree;

aligning the second abstract tree representation associated with the particular post with the third abstract tree representation to obtain a first plurality of overlap nodes, each node of the first plurality of overlap nodes corresponding with a node in the second abstract tree representation;

determining a first plurality of relevancy scores, each relevancy score of the first plurality of relevancy scores corresponding with an overlap node of the first plurality of overlap nodes; and selecting a subset of the second abstract tree representation as the second abstract tree representation based on the first plurality of relevancy scores;

determining a set of similarity scores, each similarity score of the set of similarity scores determined by comparing the first abstract tree representation with a corresponding one of the second abstract tree representations of the set of second abstract tree representations; and selecting a particular post of the set of posts based on the similarity score between the first abstract tree representation and a particular second abstract tree representation of the set of second abstract tree representations associated with a particular second context, the particular second context associated with a particular portion of a particular software program and a particular violation of the particular post.

2. The method of claim 1, wherein the first portion of the first software program that includes the first violation is a method in the first software program that includes the first violation.

3. The method of claim 1, wherein modifying the first abstract syntax tree comprises:

combining a first node and a second node of the first abstract syntax tree to generate a third node of the first abstract tree representation;

inferring a data type of a variable of the third node of the first abstract tree representation to generate a fourth node of the first abstract tree representation; and generalizing a construct of the third node of the first abstract tree representation.

4. The method of claim 1, further comprising:

obtaining a fourth abstract syntax tree of a second patch associated with the particular post of the set of posts;

modifying the fourth abstract syntax tree to obtain a fourth abstract tree representation of the second patch by simplifying and abstracting the fourth abstract syntax tree;

aligning the second abstract tree representation associated with the particular post with the fourth abstract tree representation to obtain a second plurality of overlap nodes, each node of the second plurality of overlap nodes corresponding with a node in the second abstract tree representation; and determining a second plurality of relevancy scores, each relevancy score of the second plurality of relevancy scores corresponding with an overlap node of the second plurality of overlap nodes, wherein selecting the subset of the second abstract tree representation as the second abstract tree representation is further based on the second plurality of relevancy scores.

5. The method of claim 4 wherein the first patch is associated with a first number of answer votes and a first accepted answer flag and the second patch is associated with a second number of answer votes and a second accepted answer flag and wherein the first plurality of relevancy scores are determined based on the first number of answer votes and the first accepted answer flag and the second plurality of relevancy scores are determined based on the second number of answer votes and the second accepted answer flag.

6. The method of claim 1, wherein searching the at least one website to identify the set of posts comprises:

generating a search query based on the one or more characteristics of the first violation and based on one or more tags, the one or more tags indicating whether a post includes an answer or a source code language for the post;

ranking a plurality of posts on the at least one web site based on the search query; and identifying the highest ten ranked posts as the set of posts.

7. A non-transitory computer-readable medium having encoded therein, programming code executable by a processor to perform operations comprising:

identifying a first violation in a first software program;

identifying one or more characteristics of the first violation;

searching at least one website to identify a set of posts on the at least one website, each post of the set of posts being identified based on each post including content with respect to one or more second violations of second software programs that have at least one of the one or more characteristics of the first violation;

obtaining, as a first context, a first portion of the first software program that includes the first violation;

obtaining a set of second contexts, each second context of the set of second contexts corresponding to a different post of the set of posts, each second context including a respective portion of a corresponding one of the other software programs that includes a corresponding other violation;

obtaining a first abstract syntax tree of the first context;

obtaining a set of second abstract syntax trees, each second abstract syntax tree of the set of second abstract syntax trees corresponding to a different second context of the set of second contexts;

modifying the first abstract syntax tree to obtain a first abstract tree representation of the first context by simplifying and abstracting the first abstract syntax tree;

modifying each second abstract syntax tree of the set of second abstract syntax trees to obtain a set of second abstract tree representations by simplifying and abstracting each second abstract syntax tree, wherein modifying each second abstract syntax tree of the set of second abstract syntax trees to obtain the set of second abstract tree representations by simplifying and abstracting each second abstract syntax tree comprises:

obtaining a third abstract syntax tree of a first patch associated with a particular post of the set of posts;

modifying the third abstract syntax tree to obtain a third abstract tree representation of the first patch by simplifying and abstracting the third abstract syntax tree;

aligning the second abstract tree representation associated with the particular post with the third abstract tree representation to obtain a first plurality of overlap nodes, each node of the first plurality of overlap nodes corresponding with a node in the second abstract tree representation;

determining a first plurality of relevancy scores, each relevancy score of the first plurality of relevancy scores corresponding with an overlap node of the first plurality of overlap nodes; and selecting a subset of the second abstract tree representation as the second abstract tree representation based on the first plurality of relevancy scores;

determining a set of similarity scores, each similarity score of the set of similarity scores determined by comparing the first abstract tree representation with a corresponding one of the second abstract tree representations of the set of second abstract tree representations; and selecting a particular post of the set of posts based on the similarity score between the first abstract tree representation and a particular second abstract tree representation of the set of second abstract tree representations associated with a particular second context, the particular second context associated with a particular portion of a particular software program and a particular violation of the particular post.

8. The non-transitory computer-readable medium of claim 7, wherein the first portion of the first software program that includes the first violation is a method in the first software program that includes the first violation.

9. The non-transitory computer-readable medium of claim 7, wherein modifying the first abstract syntax tree comprises:

combining a first node and a second node of the first abstract syntax tree to generate a third node of the first abstract tree representation;

inferring a data type of a variable of the third node of the first abstract tree representation to generate a fourth node of the first abstract tree representation; and generalizing a construct of the third node of the first abstract tree representation.

10. The non-transitory computer-readable medium of claim 7, the operations further comprising:

obtaining a fourth abstract syntax tree of a second patch associated with the particular post of the set of posts;

modifying the fourth abstract syntax tree to obtain a fourth abstract tree representation of the second patch by simplifying and abstracting the fourth abstract syntax tree;

aligning the second abstract tree representation associated with the particular post with the fourth abstract tree representation to obtain a second plurality of overlap nodes, each node of the second plurality of overlap nodes corresponding with a node in the second abstract tree representation; and determining a second plurality of relevancy scores, each relevancy score of the second plurality of relevancy scores corresponding with an overlap node of the second plurality of overlap nodes, wherein selecting the subset of the second abstract tree representation as the second abstract tree representation is further based on the second plurality of relevancy scores.

11. The non-transitory computer-readable medium of claim 10 wherein the first patch is associated with a first number of answer votes and a first accepted answer flag and the second patch is associated with a second number of answer votes and a second accepted answer flag and wherein the first plurality of relevancy scores are determined based on the first number of answer votes and the first accepted answer flag and the second plurality of relevancy scores are determined based on the second number of answer votes and the second accepted answer flag.

12. The non-transitory computer-readable medium of claim 7, wherein searching the at least one website to identify the set of posts comprises:

generating a search query based on the one or more characteristics of the first violation and based on one or more tags, the one or more tags indicating whether a post includes an answer or a source code language for the post;

ranking a plurality of posts on the at least one web site based on the search query; and identifying the highest ten ranked posts as the set of posts.

13. A system comprising:

one or more processors; and one or more computer-readable media configured to store instructions that in response to being executed by the one or more processors cause the system to perform operations, the operations comprising:

identifying a first violation in a first software program;

identifying one or more characteristics of the first violation;

searching at least one website to identify a set of posts on the at least one website, each post of the set of posts being identified based on each post including content with respect to one or more other violations of other software programs that have at least one of the one or more characteristics of the first violation;

obtaining, as a first context, a first portion of the first software program that includes the first violation;

obtaining a set of second contexts, each second context of the set of second contexts corresponding to a different post of the set of posts, each second context including a respective portion of a corresponding one of the other software programs that includes a corresponding other violation;
obtaining a first abstract syntax tree of the first context;
obtaining a set of second abstract syntax trees, each second abstract syntax tree of the set of second abstract syntax trees corresponding to a different second context of the set of second contexts;
modifying the first abstract syntax tree to obtain a first abstract tree representation of the first context by simplifying and abstracting the first abstract syntax tree;
modifying each second abstract syntax tree of the set of second abstract syntax trees to obtain a set of second abstract tree representations by simplifying and abstracting each second abstract syntax tree, wherein modifying each second abstract syntax tree of the set of second abstract syntax trees to obtain the set of second abstract tree representations by simplifying and abstracting each second abstract syntax tree comprises:
  obtaining a third abstract syntax tree of a first patch associated with a particular post of the set of posts;
  modifying the third abstract syntax tree to obtain a third abstract tree representation of the first patch by simplifying and abstracting the third abstract syntax tree;
  aligning the second abstract tree representation associated with the particular post with the third abstract tree representation to obtain a first plurality of overlap nodes, each node of the first plurality of overlap nodes corresponding with a node in the second abstract tree representation;
  determining a first plurality of relevancy scores, each relevancy score of the first plurality of relevancy scores corresponding with an overlap node of the first plurality of overlap nodes; and
  selecting a subset of the second abstract tree representation as the second abstract tree representation based on the first plurality of relevancy scores;
determining a set of similarity scores, each similarity score of the set of similarity scores determined by comparing the first abstract tree representation with a corresponding one of the second abstract tree representations of the set of second abstract tree representations; and
selecting a particular post of the set of posts based on the similarity score between the first abstract tree representation and a particular second abstract tree representation of the set of abstract tree representations associated with a particular second context, the particular second context associated with a particular portion of a particular software program and a particular violation of the particular post.

14. The system of claim 13, wherein the first portion of the first software program that includes the first violation is a method in the first software program that includes the first violation.

15. The system of claim 13, wherein modifying the first abstract syntax tree comprises:
  combining a first node and a second node of the first abstract syntax tree to generate a third node of the first abstract tree representation;
  inferring a data type of a variable of the third node of the first abstract tree representation to generate a fourth node of the first abstract tree representation; and
  generalizing a construct of the third node of the first abstract tree representation.

16. The system of claim 13, the operations further comprising:
  obtaining a fourth abstract syntax tree of a second patch associated with the particular post of the set of posts;
  modifying the fourth abstract syntax tree to obtain a fourth abstract tree representation of the second patch by simplifying and abstracting the fourth abstract syntax tree;
  aligning the second abstract tree representation associated with the particular post with the fourth abstract tree representation to obtain a second plurality of overlap nodes, each node of the second plurality of overlap nodes corresponding with a node in the second abstract tree representation; and
  determining a second plurality of relevancy scores, each relevancy score of the second plurality of relevancy scores corresponding with an overlap node of the second plurality of overlap nodes,
  wherein selecting the subset of the second abstract tree representation as the second abstract tree representation is further based on the second plurality of relevancy scores.

17. The system of claim 13, wherein searching the at least one website to identify the set of posts comprises:
  generating a search query based on the one or more characteristics of the first violation and based on one or more tags, the one or more tags indicating whether a post includes an answer or a source code language for the post;
  ranking a plurality of posts on the at least one web site based on the search query; and
  identifying the highest ten ranked posts as the set of posts.

* * * * *